United States Patent
Kato et al.

(10) Patent No.: US 10,694,128 B2
(45) Date of Patent: Jun. 23, 2020

(54) SOLID-STATE IMAGE PICKUP APPARATUS AND DRIVING METHOD FOR SOLID-STATE IMAGE PICKUP APPARATUS

(71) Applicant: SONY CORPORATION, Tokyo (JP)

(72) Inventors: Akihiko Kato, Tokyo (JP); Yusuke Oike, Kanagawa (JP)

(73) Assignee: SONY CORPORATION, Tokyo (JM)

( * ) Notice: Subject to any disclaimer, the term of this patent is extended or adjusted under 35 U.S.C. 154(b) by 1 day.

(21) Appl. No.: 15/743,100

(22) PCT Filed: Jun. 3, 2016

(86) PCT No.: PCT/JP2016/066553
§ 371 (c)(1),
(2) Date: Jan. 9, 2018

(87) PCT Pub. No.: WO2017/013949
PCT Pub. Date: Jan. 26, 2017

(65) Prior Publication Data
US 2019/0082129 A1    Mar. 14, 2019

(30) Foreign Application Priority Data
Jul. 23, 2015   (JP) .................................. 2015-145439

(51) Int. Cl.
*H04N 5/361*    (2011.01)
*H04N 5/378*    (2011.01)
(Continued)

(52) U.S. Cl.
CPC ......... *H04N 5/361* (2013.01); *H04N 5/36963* (2018.08); *H04N 5/378* (2013.01); *H04N 5/37455* (2013.01); *H04N 9/04561* (2018.08)

(58) Field of Classification Search
CPC .............. H04N 5/361; H04N 5/36963; H04N 5/37455; H04N 5/378; H04N 9/04561
See application file for complete search history.

(56) References Cited

U.S. PATENT DOCUMENTS

| 7,141,775 B2* | 11/2006 | Koseki | H04N 5/378 250/208.1 |
| 2007/0131846 A1* | 6/2007 | Eskerud | H04N 5/3658 250/208.1 |

(Continued)

FOREIGN PATENT DOCUMENTS

| CN | 101257560 A | 9/2008 |
| EP | 1968307 A2 | 9/2008 |

(Continued)

OTHER PUBLICATIONS

International Search Report and Written Opinion of PCT Application No. PCT/JP2016/066553, dated Aug. 30, 2016, 08 pages of ISRWO.

*Primary Examiner* — Amy R Hsu
(74) *Attorney, Agent, or Firm* — Chip Law Group

(57) ABSTRACT

A solid-state image pickup apparatus includes a pixel array unit in which image signal generation pixels for generating analog image signals in response to light irradiated thereupon and correction signal generation pixels for generating analog correction signals for correcting the image signals are arranged in a matrix pattern. A conversion unit performs first conversion that is conversion from the analog image signals generated by the image signal generation pixels arranged in a row in the matrix pattern into digital image signals. The conversion unit further performs second conversion, which is conversion performed at substantially the same time with the first conversion, from the analog correction signals generated by the correction signal generation pixels arranged in a plurality of rows in the matrix pattern into digital correction signals. A correction unit performs correction of the digital image signals with the digital correction signals generated in the plurality of rows.

11 Claims, 23 Drawing Sheets

(51) Int. Cl.
*H04N 5/369* (2011.01)
*H04N 9/04* (2006.01)
*H04N 5/3745* (2011.01)

(56) References Cited

U.S. PATENT DOCUMENTS

| | | |
|---|---|---|
| 2008/0211946 A1 | 9/2008 | Uchida |
| 2011/0115952 A1* | 5/2011 | Watanabe ............ H04N 5/3595 348/243 |
| 2011/0317055 A1* | 12/2011 | Nozaki ................ H04N 5/361 348/308 |
| 2012/0127338 A1* | 5/2012 | Suzuki ................ H04N 5/361 348/229.1 |
| 2014/0027611 A1* | 1/2014 | Patel .................. H04N 5/361 250/208.1 |

FOREIGN PATENT DOCUMENTS

| | | |
|---|---|---|
| JP | 2003-087656 A | 3/2003 |
| JP | 2008-219293 A | 9/2008 |
| JP | 2011-101170 A | 5/2011 |
| JP | 2015-039086 A | 2/2015 |
| WO | 2013/088699 A1 | 6/2013 |

* cited by examiner

SOLID-STATE IMAGE PICKUP APPARATUS AND DRIVING METHOD FOR SOLID-STATE IMAGE PICKUP APPARATUS

CROSS REFERENCE TO RELATED APPLICATIONS

This application is a U.S. National Phase of International Patent Application No. PCT/JP2016/066553 filed on Jun. 3, 2016, which claims priority benefit of Japanese Patent Application No. JP 2015-145439 filed in the Japan Patent Office on Jul. 23, 2015. Each of the above-referenced applications is hereby incorporated herein by reference in its entirety.

TECHNICAL FIELD

The present technology relates to a solid-state image pickup apparatus and a driving method for a solid-state image pickup apparatus. Particularly, the present technology relates to a solid-state image pickup apparatus and a driving method for a solid-state image pickup apparatus in which correction pixels for noise removal are arranged.

BACKGROUND ART

Conventionally, a solid-state image pickup apparatus used in a camera and so forth includes a pixel array unit in which pixels that generate an image signal in response to light irradiated thereupon are arrayed in a matrix pattern. The image signals generated by the pixels are read out in a unit of a row from the pixel array unit, and analog to digital conversion is performed in parallel for the image signals for one row. Since this analog to digital conversion is performed in a unit of a row, noise of a same phase is mixed into the image signals for one row and causes luminance unevenness or the like for each row. There is a problem that the picture quality is degraded by this. Therefore, a system has been proposed which performs correction of image signals obtained by analog to digital conversion to remove noise components for each row (for example, refer to PTL 1).

CITATION LIST

Patent Literature

[PTL 1]
JP 2003-087656A

SUMMARY

Technical Problem

The conventional technology described above uses a pixel array unit in which a plurality of correction pixels are arranged for each row. Here, a correction pixel is a pixel blocked against light and is a pixel that generates a correction signal that is an image signal from which any influence of light is removed. Correction is performed by determining an average of correction signals generated by the correction pixels as a noise component and subtracting the noise component from the image signals. However, in order to perform more accurate extraction of a noise component, it is necessary to calculate an average value from many correction signals. Therefore, there is a problem that it is necessary to arrange many correction pixels for each row.

The present technology has been created in view of such a situation as described above, and it is an object of the present technology to reduce the number of correction pixels necessary for removal of noise.

Solution to Problem

The present technology has been made in order to solve the problem described above, and a first aspect of the present technology is a solid-state image pickup apparatus including: a pixel array unit in which image signal generation pixels for generating analog image signals in response to light irradiated thereupon and correction signal generation pixels for generating analog correction signals for correcting the image signals are arranged in a matrix pattern; a conversion unit that performs first conversion that is conversion from the analog image signals generated by the image signal generation pixels arranged in a row in the matrix pattern into digital image signals and second conversion, which is conversion performed at substantially the same time with the first conversion, from the analog correction signals generated by the correction signal generation pixels arranged in a plurality of rows in the matrix pattern into digital correction signals; and a correction unit that performs correction of the digital image signals with the digital correction signals generated in the plurality of rows. This brings about action that correction of the digital image signals is performed with the digital correction signals generated in the plurality of rows.

Further, in this first aspect, the correction unit may perform the correction based on an average of the digital correction signals generated in the plurality of rows. This brings about action that the correction is performed with an average value of the digital correction signals generated in the plurality of rows.

Further, in this first aspect, the conversion unit may perform first conversion that is conversion from the analog image signals generated by the image signal generation pixels arranged in a plurality of rows in the matrix pattern into the digital image signals and the second conversion. This brings about action that correction of the digital image signals generated in the plurality of rows is performed with the digital correction signals generated in the plurality of rows.

Further, in this first aspect, the pixel array unit may include a plurality of image signal generation pixels corresponding to light of wavelengths different from each other, and the correction unit may perform the correction for each of the image signal generation pixels corresponding to light of the plurality of wavelengths different from each other. This brings about action that the correction is performed for each of the image signal generation pixels corresponding to light of the plurality of different wavelengths.

Further, in this first aspect, the conversion unit may perform first conversion that is conversion from the analog image signals generated by the image signal generation pixels arranged in a plurality of rows in the matrix pattern and corresponding to light of a same wavelength into the digital image signals and the second conversion. This brings about action that the correction is performed for each of the image signal generation pixels corresponding to light of a same wavelength disposed in the plurality of rows.

Further, in this first aspect, in the pixel array unit, the plurality of image signal generation pixels corresponding to light of the wavelengths different from each other may be arranged based on a given rule. This brings about action that the correction is performed for each of the image signal generation pixels corresponding to light of a same wavelength arranged based on the given rule.

Further, in this first aspect, the pixel array unit may include red pixels that generate analog image signals corresponding to red light, green pixels that generate analog image signals corresponding to green light and blue pixels that generate analog image signals corresponding to blue light, which are disposed in a Bayer array pattern. This brings about action that the correction is performed for each of the image signal generation pixels corresponding to light of a same wavelength disposed in the Bayer array pattern.

Further, in this first aspect, the pixel array unit may include a plurality of column signal lines that transmit the analog image signals and the analog correction signals to the conversion unit, and the red pixels, green pixels, blue pixels and correction signal generation pixels may be electrically connected to different ones of the column signal lines for every two rows in the matrix pattern. This brings about action that analog to digital conversion of image signals for each two rows is performed substantially at the same time.

Further, in this first aspect, the pixel array unit may include red pixels that generate analog image signals corresponding to red light, green pixels that generate analog image signals corresponding to green light, blue pixels that generate analog image signals corresponding to blue light and white pixels that generate analog image signals corresponding to white light. This brings about action that the correction is performed for the red pixels, green pixels, blue pixels and white pixels each.

Further, in this first aspect, the conversion unit may perform first conversion that is conversion from the analog image signals generated by the image signal generation pixels that are arranged in the plurality of rows, different from a plurality of rows that are made a target of an average value calculation in a resolution conversion process that is a process for converting a resolution of an image including the digital image signals for which the correction has been performed, and correspond to light of a same wavelength into the digital image signals, and the second conversion. This brings about action that the correction is performed for each of the image signal generation pixels corresponding to light of a same wavelength arranged in the plurality of rows different from a plurality of rows that are made a target of the resolution conversion process.

Further, in this first aspect, the correction unit may generate image signals corresponding to differences between noise generated based on the digital correction signals and the digital image signals to perform the correction. This brings about action that image signals corresponding to the differences between noise generated based on the digital correction signals and the digital image signals are generated.

Further, in this first aspect, the correction signal generation pixels may generate, as the analog correction signals, the analog image signals that include the image signal generation pixels blocked against light and from which an influence of external light is eliminated. This brings about action that the analog image signals from which any influence of external light is excluded are generated as the analog correction signals.

Meanwhile, a second aspect of the present technology is a driving method for a solid-state image pickup apparatus, including: a conversion procedure for performing first conversion that is conversion from analog image signals generated by image signal generation pixels arrayed in a row in a matrix pattern of a pixel array unit, in which the image signal generation pixels for generating analog image signals in response to light irradiated thereupon and correction signal generation pixels for generating analog correction signals for correcting the image signals are arranged in the matrix pattern, into digital image signals and second conversion, which is conversion performed at substantially the same time with the first conversion, from the analog correction signals generated by the correction signal generation pixels arranged in a plurality of rows in the matrix pattern into digital correction signals; and a correction procedure for performing correction of the digital image signals with the digital correction signals generated in the plurality of rows. This brings about action that correction of the digital image signals is performed with the digital correction signals generated in the plurality of rows.

Advantageous Effect of Invention

According to the present technology, a superior effect that the number of correction pixels necessary for removal of noise is reduced can be achieved. It is to be noted that the effect described here is not necessarily restrictive and may be any of the effects described in the present disclosure.

DESCRIPTION OF EMBODIMENTS

In the following, the modes for carrying out the present technology (hereinafter referred to as embodiments) are described. The description is given in the following order.

1. First Embodiment (example of a case in which image signals of a same type for two rows are read out)
2. Second Embodiment (example of a case in which image signals of plural types for two rows are read out)
3. Third Embodiment (example of a case in which image signals of a same type for four rows are read out)
4. Fourth Embodiment (example of a case in which white pixels are provided)
5. Fifth Embodiment (example of a case in which processing is performed for analog image signals from pixels arranged in two rows at intervals other than every other row)

1. First Embodiment

[Configuration of Solid-State Image Pickup Apparatus]

Figure 1:
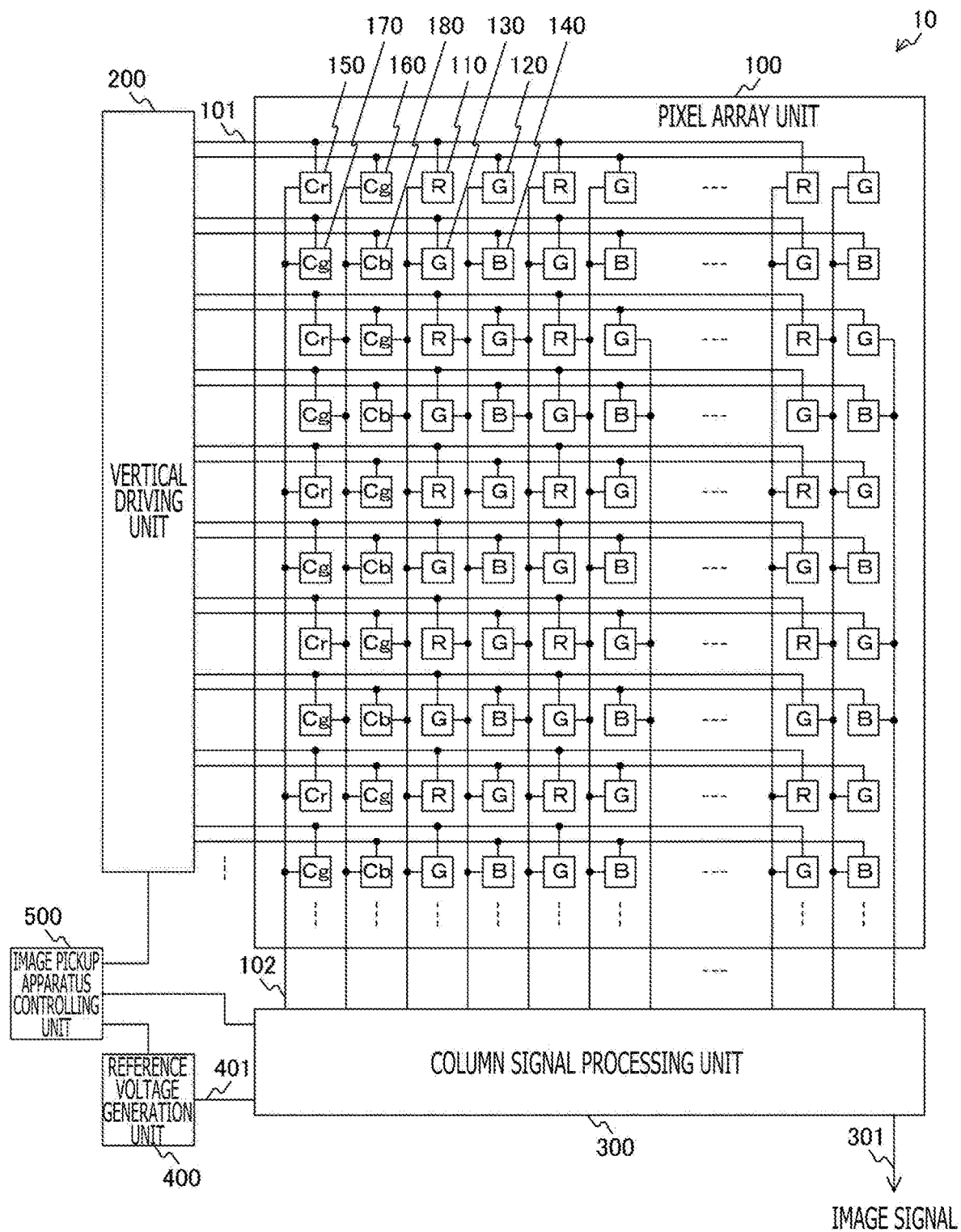
FIG. 1 is a view depicting an example of a configuration of a solid-state image pickup apparatus 10 according to a first embodiment of the present technology.

FIG. 1 is a view depicting an example of a configuration of a solid-state image pickup apparatus 10 according to a first embodiment of the present technology. The solid-state image pickup apparatus 10 includes a pixel array unit 100, a vertical driving unit 200, a column signal processing unit 300, a reference voltage generation unit 400 and an image pickup apparatus controlling unit 500.

The pixel array unit 100 is configured such that pixels (pixels 110 to 140) for generating analog image signals in accordance with light irradiated thereupon and correction pixels (pixels 150 to 180) for generating analog correction signals for correcting the image signals are arranged in a two-dimensional array pattern. In each of the pixels, a photoelectric conversion unit for converting light into an electric signal hereinafter described is arranged. Further, each pixel has a color filter, which is an optical filter, arranged on a light receiving face thereof and generates an analog image signal in response to light of a desired wavelength. The pixels are arranged in accordance with a predetermined rule in the pixel array unit 100. In the figure, an example is depicted in which red pixels for generating an analog image signal in response to red light, green pixels for generating an analog image signal in response to green light and blue pixels for generating an analog image signal in response to blue light are arranged as the pixels in a Bayer array pattern. In the figure, pixels to which "R," "G" and "B" are applied correspond to the red pixels (pixels 110), green pixels (pixels 120 and 130) and blue pixels (pixels 140), respectively.

Meanwhile, a photoelectric conversion unit is arranged also in each correction pixel. However, each correction pixel has a metal layer for blocking light in place of a color filter on a light receiving face thereof and generates an analog correction signal that is an analog image signal from which any influence of external light is eliminated. Further, on the correction pixels in the figure, red correction pixels, green correction pixels and blue correction pixels corresponding to the red pixels, green pixels and blue pixels, respectively, are arranged in accordance with a Bayer array pattern. In the figure, correction pixels to which "Cr," "Cg" and "Cb" are applied correspond to red correction pixels (correction pixels 150), green correction pixels (correction pixels 160 and 170) and blue correction pixels (correction pixels 180), respectively. It is to be noted that, although, according to the pixel array unit 100 of the figure, two correction pixels (correction pixels 150 and 160 or correction pixels 170 and 180) are arranged in each row, arrangement of the correction pixels is not limited to this and a different number of correction pixels can be arranged.

Further, in the pixel array unit 100, row signal lines 101 and column signal lines 102 are arranged in an XY matrix and wired to the pixels and so forth. The row signal lines 101 are signal lines for transmitting a control signal to the pixels 110 to 140 and the correction pixels 150 to 180. Meanwhile, the column signal lines 102 are signal lines for transmitting analog image signals and so forth generated by the pixels 110 to 140 and the correction pixels 150 to 180. The row signal lines 101 in the figure include row signal lines 101 for odd-numbered columns wired in common to the pixels 110 and so forth arranged in the odd-numbered columns among the pixels 110 and so forth and row signal lines 101 for even-numbered columns wired in common to the pixels 110 and so forth arranged in the even-numbered columns. In the figure, the row signal lines 101 for odd-numbered columns are connected to the pixels 110 and 130 and the correction pixels 150 and 170 and the row signal lines 101 for even-numbered columns are connected to the pixels 120 and 140 and the correction pixels 160 and 180.

Meanwhile, to the pixels 110 and so forth arranged in the column direction, the column signal lines 102 are wired in common. Thereupon, the pixels 110 and so forth are connected to different ones of the column signal lines 102 for every two rows. Describing this with numbers applied in order to the column signal lines 102 of the figure beginning with the column signal line 102 arranged at the left end, the pixels 110 and 130 arranged in the first and second rows are connected to the third column signal line 102. In contrast, the pixels 110 and 130 arranged in the third and fourth rows are connected to the fourth column signal line 102. In this manner, the pixels are connected to the third or fourth column signal line 102 for every two rows. This similarly applies also to the other pixels and correction pixels. Consequently, analog image signals from the pixels 110 and so forth connected to different ones of the column signal lines 102 can be outputted simultaneously. Since the pixels 110 and so forth are arranged in a Bayer array pattern and are connected to different ones of the column signal lines 102 for every two rows, analog image signals from pixels corresponding to light of a same wavelength disposed in every other row can be outputted simultaneously. For example, simultaneous outputting from red pixels (pixels 110) arranged in the first and third rows is possible. It is to be noted that the pixels are an example of image signal generation pixels described in the claims. The correction pixels are an example of correction signal generation pixels described in the claims.

The vertical driving unit 200 drives the pixels 110 to 140 and the correction pixels 150 to 180. The vertical driving unit 200 outputs control signals through the row signal lines 101 to the pixels 110 and so forth to perform driving. The control signals include control signals for controlling starting and stopping of light exposure performed on the pixels 110 and so forth and control signals for controlling reading out of analog image signals obtained by the light exposure from the pixels 110 and so forth. Of the control signals, readout signals that are signals for controlling reading out of an analog image signal from a pixel 110 and so forth can be outputted to the pixels 110 and so forth arranged in two rows simultaneously. For example, a readout signal is outputted to the pixels 110 and 130 and the correction pixels 150 and 170 wired to the row signal line 101 for an odd-numbered column in the first row and the row signal line 101 for an odd-numbered column in the third row. Then, a readout signal is outputted to the pixels 120 and 140 and the correction pixels 160 and 180 wired to the row signal line 101 for an even-numbered column in the first row and the row signal line 101 for an even-numbered column in the third row. Thereafter, the readout signals can be outputted in order to the row signal lines 101 for an odd-numbered column in the second and fourth rows and the row signal lines 101 for an even-numbered column in the second and fourth rows.

The column signal processing unit 300 processes analog image signals generated by the pixels 110 to 140 and analog correction signals generated by the correction pixels 150 to 180. To the processing by the column signal processing unit 300, analog to digital conversion for converting analog image signals generated by the pixels 110 and so forth into digital image signals corresponds. To the column signal processing unit 300, analog image signals and so forth corresponding to the pixels 110 and so forth for one row of the pixel array unit 100 are inputted simultaneously. For the inputted analog image signals and so forth, the column signal processing unit 300 performs analog to digital conversion in parallel. Thereafter, the column signal processing unit 300 transfers the digital image signals after the conversion in a horizontal direction to output the signals to a signal line 301. The digital image signals outputted from the column signal processing unit 300 are supplied as output image signals of the solid-state image pickup apparatus 10 to the outside. Further, a reference voltage that is a voltage to be made a reference in the analog to digital conversion described above is inputted from the reference voltage generation unit 400 hereinafter described through a signal line 401. Details of a configuration of the column signal processing unit 300 are hereinafter described.

The reference voltage generation unit 400 generates a reference voltage to be made a reference in the analog to digital conversion of the column signal processing unit 300. This reference voltage is a voltage that varies in a ramp shape. Details of a configuration of the reference voltage generation unit 400 are hereinafter described.

The image pickup apparatus controlling unit 500 controls the vertical driving unit 200, column signal processing unit 300 and reference voltage generation unit 400.

[Configuration of Pixel]

Figure 2:
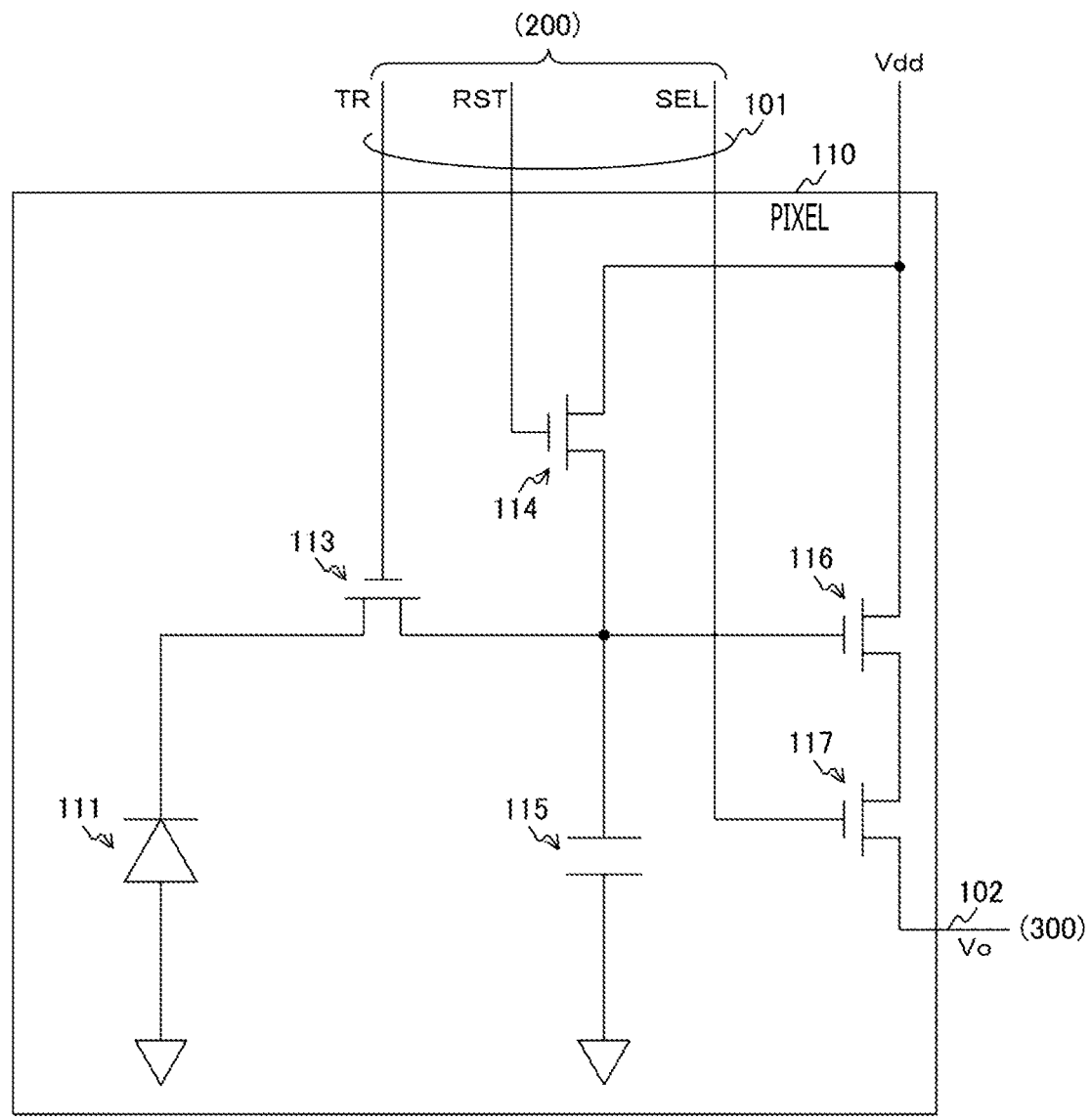
FIG. 2 is a view depicting an example of a configuration of a pixel 110 in the first embodiment of the present technology.

FIG. 2 is a view depicting an example of a configuration of each pixel 110 in the first embodiment of the present technology. A configuration of a pixel and a correction pixel is described taking the pixel 110 as an example. The pixel 110 includes a photoelectric conversion unit 111, a charge transfer unit 113, a charge holding unit 115, a charge discharging unit 114, an amplification unit 116, and a selection unit 117. It is to be noted that the charge transfer unit 113, charge discharging unit 114, amplification unit 116 and selection unit 117 each include an N-channel MOS transistor.

To the pixel 110, a row signal line 101 and a column signal line 102 are connected. The row signal line 101 includes a plurality of signal lines (TR, RST and SEL). The transfer signal line TR (Transfer) is a signal line for transmitting a control signal to the charge transfer unit 113. The reset signal line RST (Reset) is a signal line for transmitting a control signal to the charge discharging unit 114. The selection signal line SEL (Select) is a signal line for transmitting a control signal to the selection unit 117. As depicted in the figure, the signal lines are connected to the gate of MOS transistors. If a voltage (hereinafter referred to as on signal) equal to or higher than a threshold voltage between the gate and the source is inputted through one of the signal lines, then the corresponding MOS transistor is placed into a conducting state. Further, to the column signal line 102, an output signal Vo is outputted.

In addition, a power supply line Vdd and a grounding line are connected to the pixel 110. Power to the pixel 110 is supplied through the power supply line Vdd and the grounding line.

As depicted in the figure, the photoelectric conversion unit 111 is grounded at the anode thereof and connected at the cathode thereof to the source of the charge transfer unit 113. The charge transfer unit 113 is connected at the drain thereof to the source of the charge discharging unit 114, the gate of the amplification unit 116 and one end of the charge holding unit 115. The charge holding unit 115 is grounded at another end thereof. The charge transfer unit 113 is connected at the gate thereof to the transfer signal line TR. The charge discharging unit 114 is connected at the gate and the drain thereof to the reset signal line RST and the power supply line Vdd, respectively. The amplification unit 116 is connected at the drain and the source thereof to the power supply line Vdd and the drain of the selection unit 117, respectively. The selection unit 117 is connected at the gate and the source thereof to the selection signal line SEL and the column signal line 102, respectively.

The photoelectric conversion unit 111 generates charge in response to a light amount irradiated thereupon and accumulates the generated charge. This photoelectric conversion unit 111 includes a photodiode.

The charge transfer unit 113 transfers the charge generated by the photoelectric conversion unit 111 to the charge holding unit 115 under the control of the transfer signal line TR. The charge transfer unit 113 performs transfer of the charge by causing the photoelectric conversion unit 111 and the charge holding unit 115 to conduct therebetween.

The charge holding unit 115 holds the charge transferred from the charge transfer unit 113. This charge holding unit 115 includes a so-called floating diffusion formed in a diffusion region of a semiconductor chip.

The charge discharging unit 114 discharges the charge held by the charge holding unit 115 under the control of the reset signal line RST. This charge discharging unit 114 performs discharge of the charge by causing the charge holding unit 115 and the power supply line Vdd to conduct therebetween.

The amplification unit 116 outputs a voltage corresponding to the charge held by the charge holding unit 115 to the source.

The selection unit 117 outputs the voltage of the source of the amplification unit 116 to the column signal line 102 under the control of the selection signal line SEL. When this selection unit 117 is in a conducting state, the voltage of the source of the amplification unit 116 is outputted to the column signal line 102.

[Operation of Pixel]

An on signal is inputted from the transfer signal line TR to cause the charge transfer unit 113 to conduct to place the photoelectric conversion unit 111 and the charge holding unit 115 into a conducting state therebetween. Simultaneously, an on signal is inputted from the reset signal line RST to cause the charge discharging unit 114 conduct. Consequently, the power supply voltage Vdd is applied to the cathode of the photoelectric conversion unit 111 and the charge holding unit 115 to initialize, namely, reset, the pixel 110. When the inputting of the on signal to the transfer signal line TR and the reset signal line RST is stopped thereafter, charge according to an exposure light amount is generated newly and accumulated into the photoelectric conversion unit 111. In other words, exposure is started.

After predetermined exposure time elapses, an on signal is inputted from the reset signal line RST to render the charge discharging unit 114 conducting. Consequently, charge stored in the charge holding unit 115 and based on dark current is discharged. After the discharge of the charge based on the dark current, the inputting of the on signal to the reset signal line RST is stopped. When an on signal is inputted from the selection signal line SEL in this state, the selection unit 117 conducts and an analog reset signal Vo generated by the amplification unit 116 is outputted to the column signal line 102. This signal is a signal generated in the state in which charge is discharged and is a signal according to a reset voltage that is a reference to an image signal.

Thereafter, when an on signal is inputted from the transfer signal line TR, the charge transfer unit 113 conducts. Consequently, the photoelectric conversion unit 111 and the charge holding unit 115 are caused to conduct therebetween, and the charge accumulated in the photoelectric conversion unit 111 is transferred to the charge holding unit 115 and the exposure is stopped. Further, a signal according to the charge transferred to the charge holding unit 115 is generated by the amplification unit 116. When an on signal is inputted from the selection signal line SEL in this state, the selection unit 117 conducts and the analog image signal Vo generated by the amplification unit 116 is outputted to the column signal line 102. It is to be noted that the on signal inputted to the selection signal line SEL corresponds to the readout signal described hereinabove with reference to FIG. 1.

In this manner, resetting, exposure and outputting of analog image signals are performed in order. By performing this for all rows, a frame that is image signals for one screen image is generated. It is to be note that a method for generating a frame by executing resetting, exposure and outputting of an analog image signal in order at timings displaced from each other among the rows is called rolling shutter method. The rolling shutter method is a method that has, while a frame can be generated at a high speed, a defect that distortion occurs in the vertical direction of a screen image in image pickup of an image pickup object having some movement. Meanwhile, a method in which a procedure from resetting to stopping of exposure is performed at the same timing for all pixels and outputting of analog image signals is performed for every one row is called global shutter method. The global shutter method is a method by which an image free from distortion in screen image as can be obtained by the rolling shutter method can be obtained. The first embodiment of the present technology can use both the rolling shutter method and the global shutter method. Further, an analog reset signal is subtracted from a generated image signal to remove the difference for each pixel. Such a method as just described is a method called correlated double sampling (Correlated Double Sampling: CDS) and is a method that is used widely in an image pickup apparatus. This process is performed by the column signal processing unit 300.

[Configuration of Column Signal Processing Unit]

Figure 3:
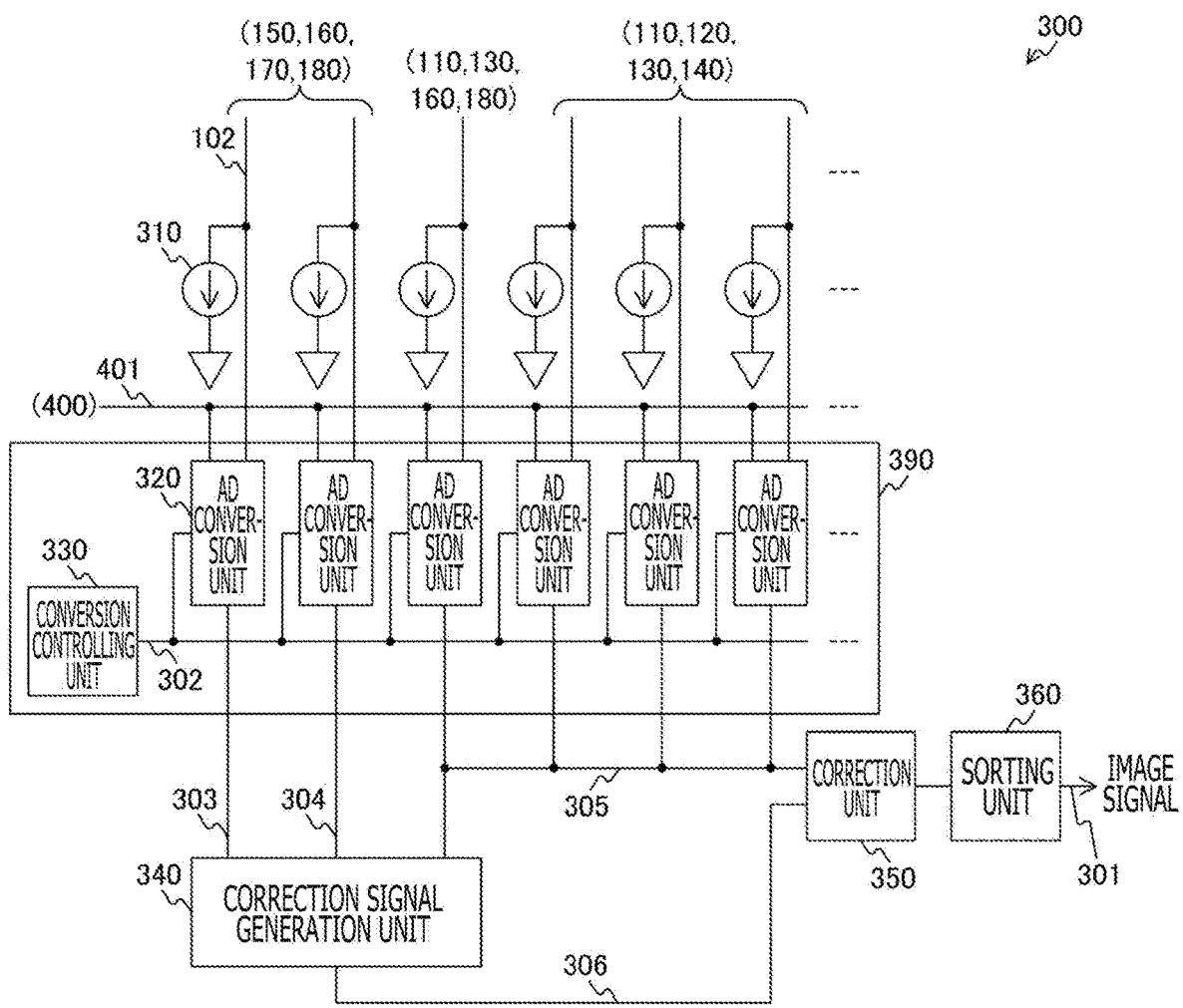
FIG. 3 is a view depicting an example of a configuration of a column signal processing unit 300 in the first embodiment of the present technology.

FIG. 3 is a view depicting an example of a configuration of the column signal processing unit 300 in the first embodiment of the present technology. This column signal processing unit 300 includes a constant current power supply 310, a conversion unit 390, a correction signal generation unit 340, a correction unit 350 and a sorting unit 360.

The conversion unit 390 performs first conversion of converting analog image signals generated by the pixels 110 to 140 arranged in a row of the pixel array unit 100 into digital image signals. Further, the conversion unit 390 performs second conversion for converting analog correction signals generated by the correction pixels 150 to 180 arranged in a plurality of rows of the pixel array unit 100 into digital correction signals. The second conversion is performed substantially simultaneously with the first conversion. It is to be noted that the conversion unit 390 in the first embodiment of the present technology converts, in the first conversion described above, analog image signals generated by the pixels 110 to 140 arranged in a plurality of rows of the pixel array unit 100 into digital image signals. Thereupon, the conversion unit 390 performs the first conversion for analog image signals outputted from the pixels corresponding to light of a same wavelength. For example, the conversion unit 390 performs the first conversion for the analog image signals generated by the red pixels from among the pixels arranged in a plurality of rows. The conversion unit 390 includes an analog to digital conversion unit (AD conversion unit) 320 and a conversion controlling unit 330.

Each column signal line 102 is connected to one end of a constant current power supply 310 and an input of an analog to digital conversion unit 320. Another end of the constant current power supply 310 is grounded. Meanwhile, to other inputs of the analog to digital conversion unit 320, signal lines 401 and 302 are connected. An output of the analog to digital conversion unit 320 is connected to an input of the correction signal generation unit 340 and the correction unit 350. As depicted in the figure, the outputs of the analog to digital conversion units 320 connected to the column signal lines 102 (first and second column signal lines 102) to which only the correction pixels (correction pixels 150 to 180) are wired are connected to the correction signal generation unit 340 by signal lines 303 and 304. The outputs of other analog to digital conversion units 320 are connected to the inputs of the correction signal generation unit 340 and the correction unit 350 by a signal line 305. Further, to another input of the correction unit 350, an output of the correction signal generation unit 340 is connected by a signal line 306. An output of the correction unit 350 is connected to an input of the sorting unit 360, and an output of the sorting unit 360 is connected to the signal line 301.

Each constant current power supply 310 operates as a load to the amplification unit 116 described hereinabove with reference to FIG. 2. In particular, the constant current power supply 310 configures a source follower circuit together with the amplification unit 116.

The analog to digital conversion units 320 perform analog to digital conversion for analog image signals and analog correction signals outputted from the pixels 110 to 140 and the correction pixels 150 to 180, respectively. The analog to digital conversion units 320 are arranged for the individual column signal lines 102 and perform analog to digital conversion as well as holding and outputting of the digital image signals and so forth after conversion. As described hereinabove, the analog to digital conversion is performed on the basis of a reference voltage. To all of the analog to digital conversion units 320 of the figure, a same reference voltage is inputted through the signal line 401. The first conversion and the second conversion described above can be performed simultaneously by all of the analog to digital conversion units 320 arranged in the column signal processing unit 300 performing analog to digital conversion at the same time. Upon the conversion, noise is generated. This noise principally arises from variation of the reference voltage, and noise of a same phase (so-called horizontal noise) mixes into digital image signals after conversion. Similarly, also digital correction signals after conversion have noise of a phase same as that of the image signals. As described hereinabove, since the analog correction signals generated by the correction pixels 150 to 180 are analog image signals from which any influence of external light is removed, the digital correction signals are signals that do not include the image signals but include noise of a phase same as that of the image signals.

The digital correction signals from between the outputs of the analog to digital conversion units 320 are inputted to the correction signal generation unit 340 through the signal lines 303 to 305. Meanwhile, the digital image signals are inputted to the correction unit 350 through the signal line 305. This signal line 305 is a signal line of the bus type and has outputs of a plurality of analog to digital conversion units 320 connected thereto. The digital image signals after conversion are outputted to the signal line 305 in order beginning with the left end analog to digital conversion unit 320 (third analog to digital conversion unit 320 from the left in the figure) from among the analog to digital conversion units 320 connected to the signal line 305. Horizontal transfer of the digital image signals is executed thereby. Control of such signal outputs is performed by the conversion controlling unit 330 hereinafter described. Details of a configuration of the analog to digital conversion units 320 are hereafter described.

The conversion controlling unit 330 controls the analog to digital conversion unit 320. The conversion controlling unit 330 controls analog to digital conversion and holding and outputting of digital image signals after conversion of the analog to digital conversion unit 320.

The correction signal generation unit 340 generates a reference correction signal. Here, the reference correction signal is a signal corresponding to a component obtained by suppressing noise generated at random in each pixel and extracting noise of a same phase (so-called horizontal noise). To the correction signal generation unit 340, the outputs of the analog to digital conversion units 320 to which the correction pixels 150 to 180 are connected through the column signal lines 102 are connected by the signal lines 303 to 305 and digital correction signals after conversion are inputted. The correction signal generation unit 340 generates a reference correction signal from the digital correction signals. Details of a configuration of the correction signal generation unit 340 are hereinafter described.

The correction unit 350 performs correction of a digital image signal on the basis of digital correction signals generated in a plurality of rows of the pixel array unit 100. The correction unit 350 in the first embodiment of the present technology performs correction of a digital image signal on the basis of a reference correction signal generated by the correction signal generation unit 340. The correction unit 350 performs correction by generating a digital image signal according to the difference between the reference correction signal and each of digital image signals transferred horizontally. By this, noise of a same phase mixed upon analog to digital conversion is removed from the digital image signal. Details of a configuration of the correction unit 350 are hereinafter described.

The sorting unit 360 performs sorting of digital image signals corrected by the correction unit 350. As hereinafter described, digital image signals outputted from the correction unit 350 are outputted in an order different from the arrangement of the pixels 110 and so forth arranged in the pixel array unit 100. This sorting unit 360 performs sorting for the digital image signals outputted from the correction unit 350 such that the digital image signals have arrangement same as that of the pixels 110 and so forth arranged in the pixel array unit 100 and outputs the sorted digital image signals. Details of a configuration of the sorting unit 360 are hereinafter described.

[Configuration of Conversion Unit]

Figure 4:
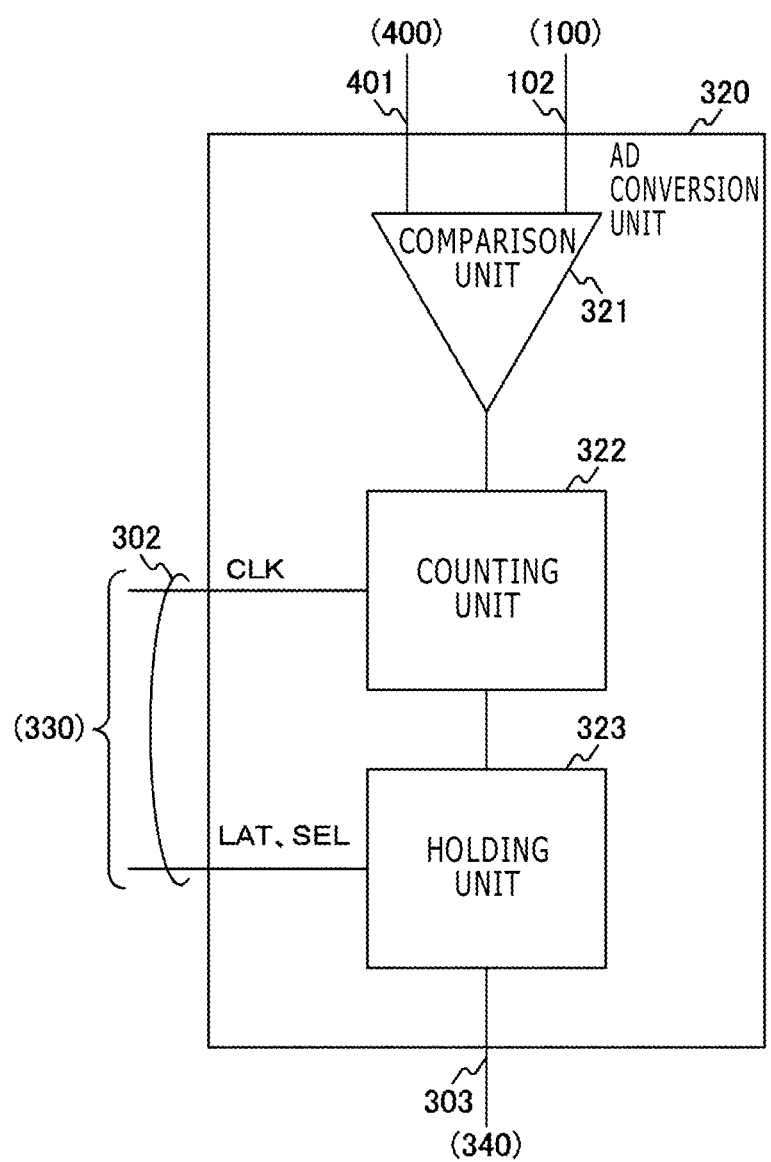
FIG. 4 is a view depicting an example of a configuration of an analog to digital conversion unit 320 in the first embodiment of the present technology.

FIG. 4 is a view depicting an example of a configuration of each analog to digital conversion unit 320 in the first embodiment of the present technology. This analog to digital conversion unit 320 includes a comparison unit 321, a counting unit 322 and a holding unit 323. Further, a signal line 302 is connected to the analog to digital conversion unit 320. The signal line 302 includes a plurality of signal lines (CLK, LAT and SEL). The clock signal line CLK (Clock) is a signal line for transmitting a clock signal to the counting unit 322. The latch signal line LAT (Latch) and the selection signal line SEL (Select) are signal lines for transmitting a control signal to the holding unit 323.

The comparison unit 321 compares an analog image signal or an analog correction signal generated by a pixel 110 or the like and a reference voltage with each other to perform detection of coincidence between the analog image signal and the reference voltage. When coincidence is detected, the comparison unit 321 can invert a logical value of an output thereof. For example, the comparison unit 321 can change the logical value of the output from the "H" level to the "L" level.

The counting unit 322 is a counter that starts its counting in response to a start of comparison by the comparison unit 321 and stops the counting in response to detection of coincidence between an analog image signal or the like and a reference voltage by the comparison unit 321. The counting unit 322 is controlled by a clock signal of the clock signal line CLK and an output of the comparison unit 321. When a clock signal is inputted to the clock signal line CLK, the counting unit 322 starts counting. Thereafter, when coincidence between an analog image signal or the like and a reference voltage is detected by the comparison unit 321, the counting unit 322 stops the counting. For example, the counting unit 322 can stop counting at a timing at which the output of the comparison unit 321 changes from the "H" level to the "L" level. After the counting is stopped, the counting unit holds the count value. This count value is outputted as a result of the analog to digital conversion. It is to be noted that, as hereinafter described, the counting unit 322 performs up counting and down counting.

The holding unit 323 performs holding of a count value of the counting unit 322, which is a result of analog to digital conversion, and outputting of the count value held therein. This holding unit is controlled by the latch signal line LAT and the selection signal line SEL. If an on signal is inputted to the latch signal line LAT, then the count value is held by the holding unit 323. On the other hand, if an on signal is inputted to the selection signal line SEL, then the count value held by the holding unit 323 is outputted to the signal line 303. It is to be noted that, after a count value is held, the counting unit 322 is reset at a predetermined timing and returns the count value to 0 (not depicted).

[Operation of Conversion Unit]

Figure 5:
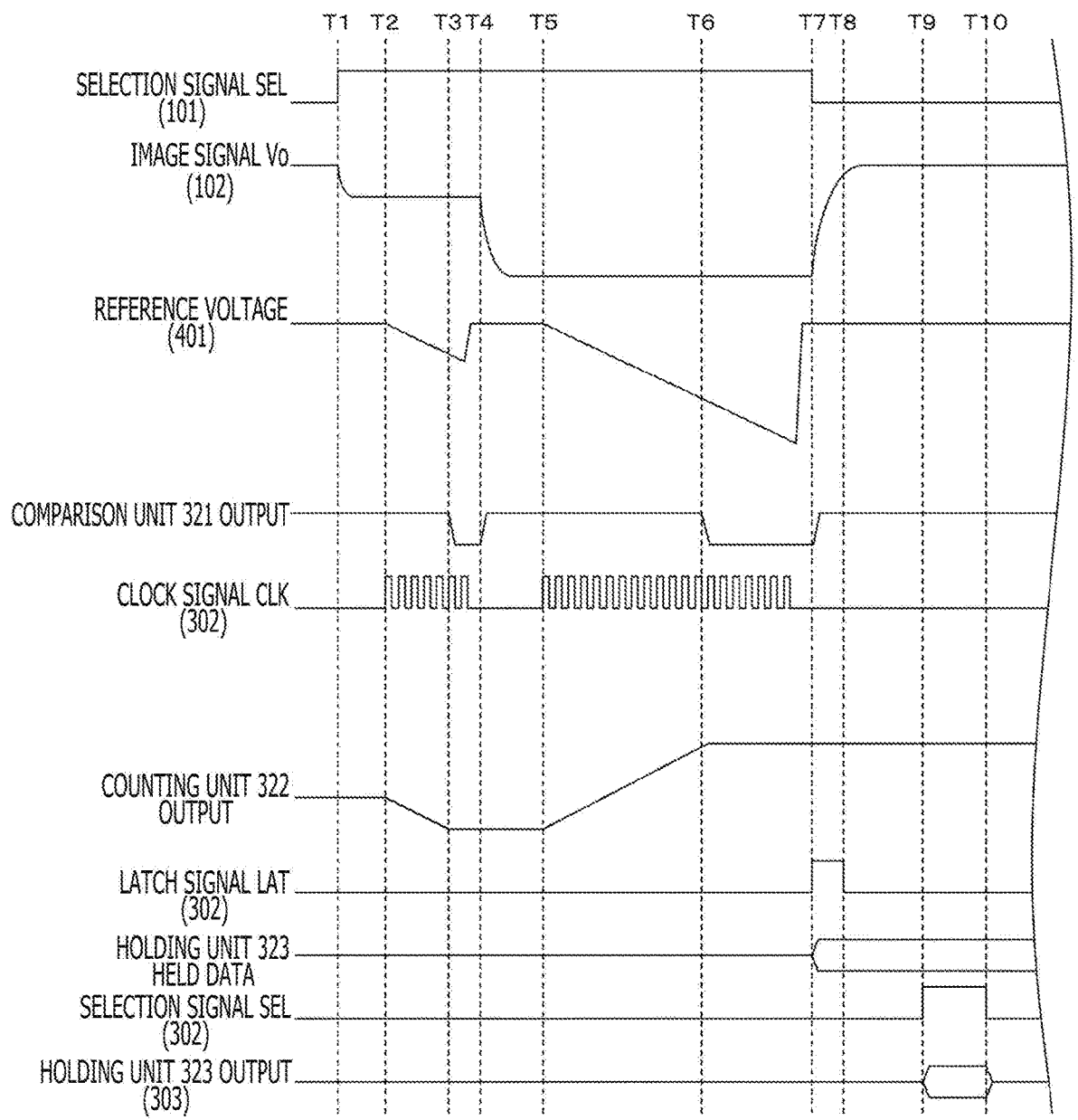
FIG. 5 is a view depicting an example of processing of the analog to digital conversion unit 320 in the first embodiment of the present technology.

FIG. 5 is a view depicting an example of processing of the analog to digital conversion unit 320 in the first embodiment of the present technology. The figure represents a relation among the selection signal SEL of the pixels 110 and so forth, output signal (analog image signal or analog correction signal) Vo, reference voltage, comparison unit 321 output, clock signal CLK and counting unit 322 output. Further, the figure represents a relation among the latch signal LAT, held data of holding unit 323, selection signal SEL of the analog to digital conversion unit 320 and holding unit 323 output. It is to be noted that the selection signal SEL and the latch signal LAT represent respective states of signals inputted to the selection signal line SEL and so forth, and a period of the value "1" of the binary digitized waveform corresponds to an input of an on signal. Operation is described taking a pixel 110 as an example.

[T1]

An on signal is inputted to the selection signal line SEL and the reset signal line RST of the pixel 110 described hereinabove with reference to FIG. 2, and an analog image signal Vo upon resetting (hereinafter referred to as reset signal) is outputted from the pixel 110. Thereafter, the inputting of an on signal of the reset signal line RST is stopped, and it is waited until the reset signal is stabilized.

[T2]

When a clock signal is supplied to the clock signal line CLK and the reference voltage starts decreasing in a ramp shape, the counting unit 322 starts counting. Within a period within which the reset signal is to be counted, the counting unit 322 performs down counting.

[T3]

If the reference voltage that decreases in a ramp shape and the analog image signal Vo become coincident with each other, then the output of the comparison unit 321 changes from the "H" level to the "L" level. Consequently, the counting unit 322 stops the counting. To the clock signal line CLK, a clock signal is supplied over a period within which an assumed maximum reset signal can be counted. Thereafter, inputting of the clock signal is stopped, and the reference voltage is reset to the original voltage.

[T4]

An on signal is inputted to the transfer signal line TR of the pixel 110, and an analog image signal Vo after accumulation in the photoelectric conversion unit 111 described hereinabove with reference to FIG. 2 is outputted from the pixel 110. Thereafter, inputting of an on signal of the transfer signal line TR is stopped, and it is waited until the analog image signal Vo after accumulation is stabilized.

[T5]

If a clock signal is supplied to the clock signal line CLK again and the reference voltage starts decreasing in a ramp shape, then the counting unit 322 starts counting. This period corresponds to a period within which a signal after the accumulation is counted. Within this period, the counting unit 322 performs up counting.

[T6]

If the reference voltage that decreases in a ramp shape and the analog image signal Vo become coincident with each other, then the output of the comparison unit 321 changes from the "H" level to the "L" level. Consequently, the counting unit 322 stops its counting. To the clock signal line CLK, a clock signal is supplied over a period within which a maximum accumulated charge amount in the photoelectric conversion unit 111 can be counted. Thereafter, inputting of the clock signal is stopped, and the reference voltage is reset to the original voltage. In this manner, the counting unit 322 performs down counting upon inputting of a reset signal and performs up counting upon inputting of an image signal after accumulation. Consequently, subtraction of a reset signal is performed from an image signal after accumulation, and a signal for which the CDS described hereinabove is performed can be obtained.

[T7]

An on signal is inputted to the latch signal LAT of the analog to digital conversion unit 320, and a count value of the counting unit 322 is held by the holding unit 323. Further, inputting of the on signal to the selection signal line SEL of the pixel 110 is stopped, and the reference voltage and the output of the comparison unit 321 restore their original states.

[T8 to T10]

If an on signal is inputted to the selection signal SEL of the analog to digital conversion unit 320, then the count value held by the holding unit 323 is outputted (T9).

By such a procedure as described above, conversion by the analog to digital conversion unit 320 is performed.

[Configuration of Correction Signal Generation Unit]

Figure 6:
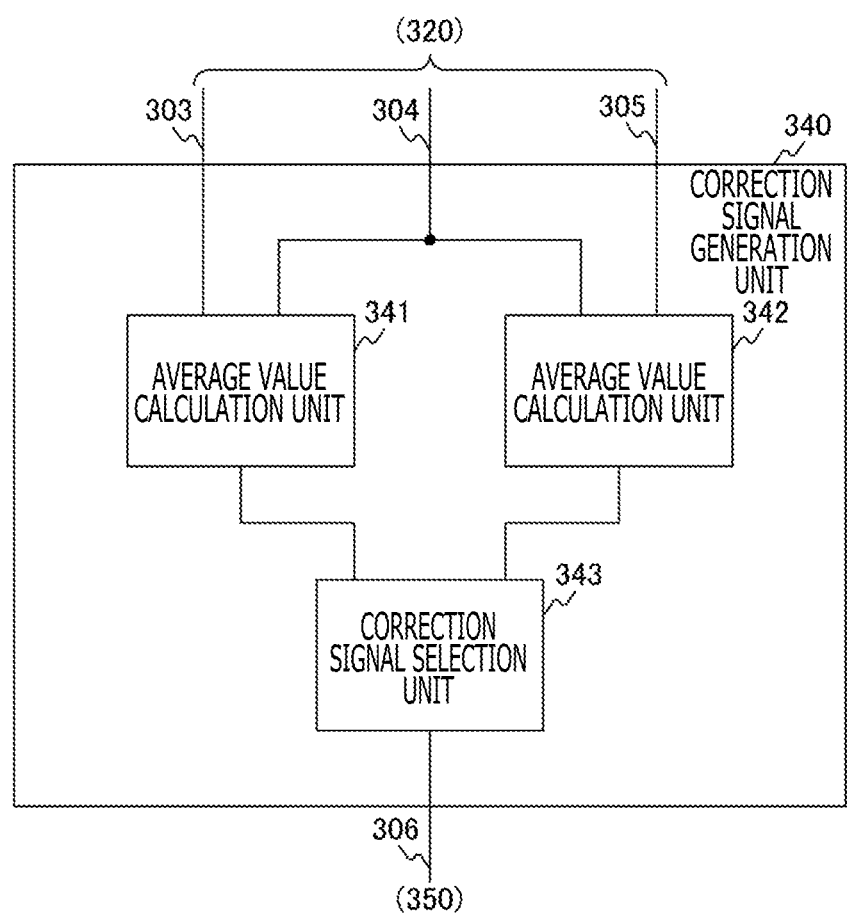
FIG. 6 is a view depicting an example of a configuration of a correction signal generation unit 340 in the first embodiment of the present technology.

FIG. 6 is a view depicting an example of a configuration of the correction signal generation unit 340 in the first embodiment of the present technology. This correction signal generation unit 340 includes average value calculation units 341 and 342 and a correction signal selection unit 343.

The average value calculation units 341 and 342 calculate an average value of inputted digital correction signals. As described hereinabove with reference to FIG. 1, the correction pixels 150 to 180 are connected to different ones of the column signal lines 102 for every two rows. In particular, the red correction pixels (correction pixels 150) are connected to the first and second column signal lines 102 for every two rows. Similarly, the green correction pixels (correction pixels 160) are connected to the second and third column signal lines 102 for every two rows. The green correction pixels (correction pixels 170) are connected to the first and second column signal lines 102 for every two rows, and the blue correction pixels (correction pixels 180) are connected to the second and third column signal lines 102.

To the average value calculation unit 341, signal lines 303 and 304 are connected to which digital correction signals corresponding to analog correction signals outputted to the first and second column signal lines 102 described above are outputted. The average value calculation unit 341 calculates an average value of digital correction signals based on red correction pixels and green correction pixels. Meanwhile, to the average value calculation unit 342, signal lines 304 and 305 are connected to which digital correction signals corresponding to analog correction signals outputted to the second and third column signal lines 102 described hereinabove are outputted. This average value calculation unit 342 calculates an average value of digital correction signals based on green correction pixels and blue correction pixels.

The correction signal selection unit 343 selects and outputs one of average values of digital correction signals calculated by the average value calculation units 341 and 342. This correction signal selection unit 343 selects and outputs an average value of digital correction signals according to a type of the digital image signals of a target of correction by the correction unit 350. In particular, when correction of image signals generated by the red pixels (pixels 110) is to be performed by the correction unit 350, the correction signal selection unit 343 selects an average value of digital correction signals calculated by the average value calculation unit 341. By this, a reference correction signal based on the correction signals generated by the red correction pixels is outputted.

[Configuration of Correction Unit]

Figure 7:
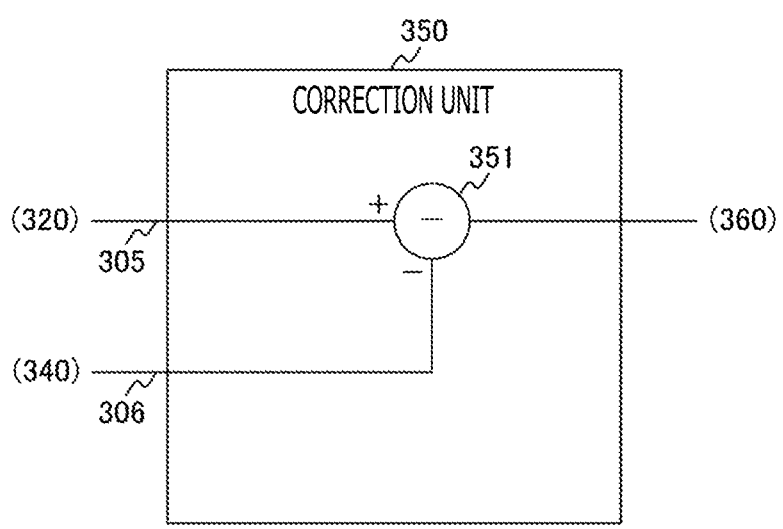
FIG. 7 is a view depicting an example of a configuration of a correction unit 350 in the first embodiment of the present technology.

FIG. 7 is a view depicting an example of a configuration of the correction unit 350 in the first embodiment of the present technology. This correction unit 350 includes a subtraction unit 351.

The subtraction unit 351 subtracts a reference correction signal from a digital image signal. This subtraction unit 351 successively performs subtraction for digital image signals transferred horizontally and outputs a digital image signal after subtraction.

[Configuration of Reference Voltage Generation Unit]

Figure 8:
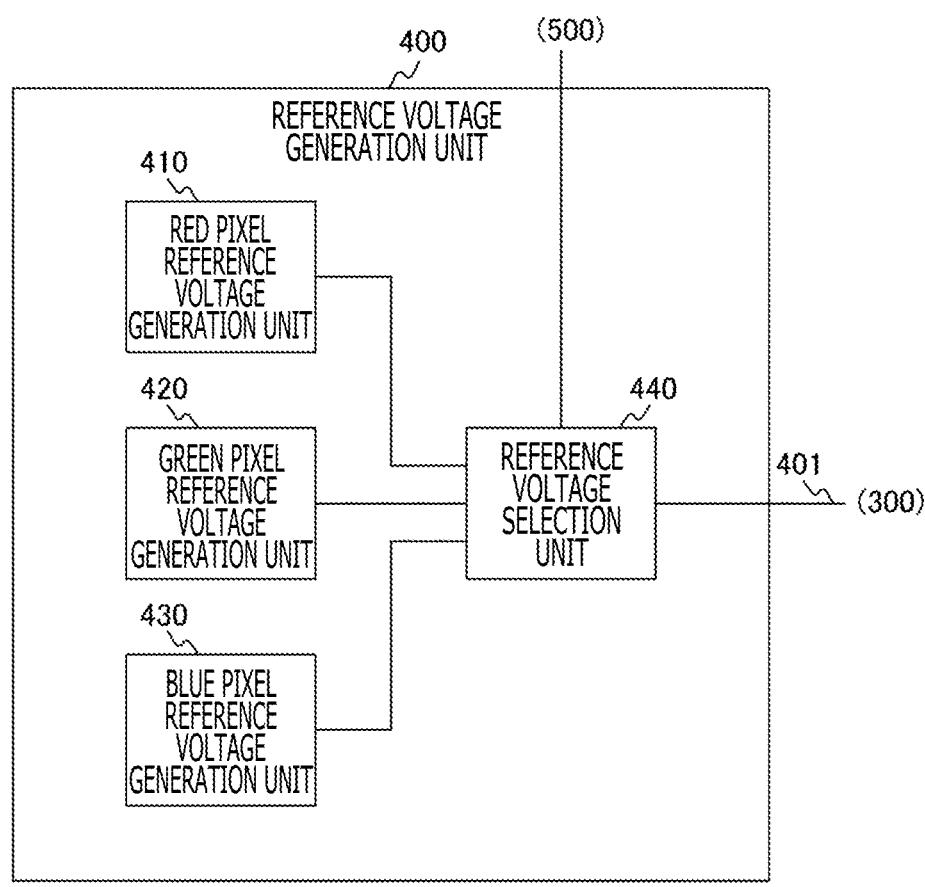
FIG. 8 is a view depicting an example of a configuration of a reference voltage generation unit 400 in the first embodiment of the present technology.

FIG. 8 is a view depicting an example of a configuration of the reference voltage generation unit 400 in the first embodiment of the present technology. The reference voltage generation unit 400 includes a red pixel reference voltage generation unit 410, a green pixel reference voltage generation unit 420, a blue pixel reference voltage generation unit 430 and a reference voltage selection unit 440.

The red pixel reference voltage generation unit 410 generates a reference voltage according to analog image signals generated by red pixels (pixels 110). The green pixel reference voltage generation unit 420 generates a reference voltage according to analog image signals generated by green pixels (pixels 120 and 130). The blue pixel reference voltage generation unit 430 generates a reference voltage according to analog image signals generated by blue pixels (pixels 140).

The reference voltage selection unit 440 selects one of reference voltages generated by the red pixel reference voltage generation unit 410, green pixel reference voltage generation unit 420 and blue pixel reference voltage generation unit 430. This reference voltage selection unit 440 selects and outputs a reference signal according to a type of an analog image signal to be converted by the analog to digital conversion unit 320. In particular, when the analog to digital conversion unit 320 is to perform conversion of an analog image signal generated by a red pixel, the reference voltage selection unit 440 selects the reference voltage generated by the red pixel reference voltage generation unit 410. Consequently, a reference voltage according to the analog image signal generated from the red pixels is outputted.

In this manner, the reference voltage generation unit 400 in the figure generates a reference voltage according to a type of an analog image signal. Consequently, where conversion operations different among different types of analog image signals are to be performed, a reference voltage ready for a case in which, for example, a gain or a black level in analog to digital conversion is to be changed for each type of an image signal or in a like case can be outputted. Further, any of the red pixel reference voltage generation unit 410 and so forth that are not selected by the reference voltage selection unit 440 can stop a generation operation of a reference voltage. Consequently, power consumption can be reduced.

[Processing of Image Pickup Apparatus]

Figure 9:
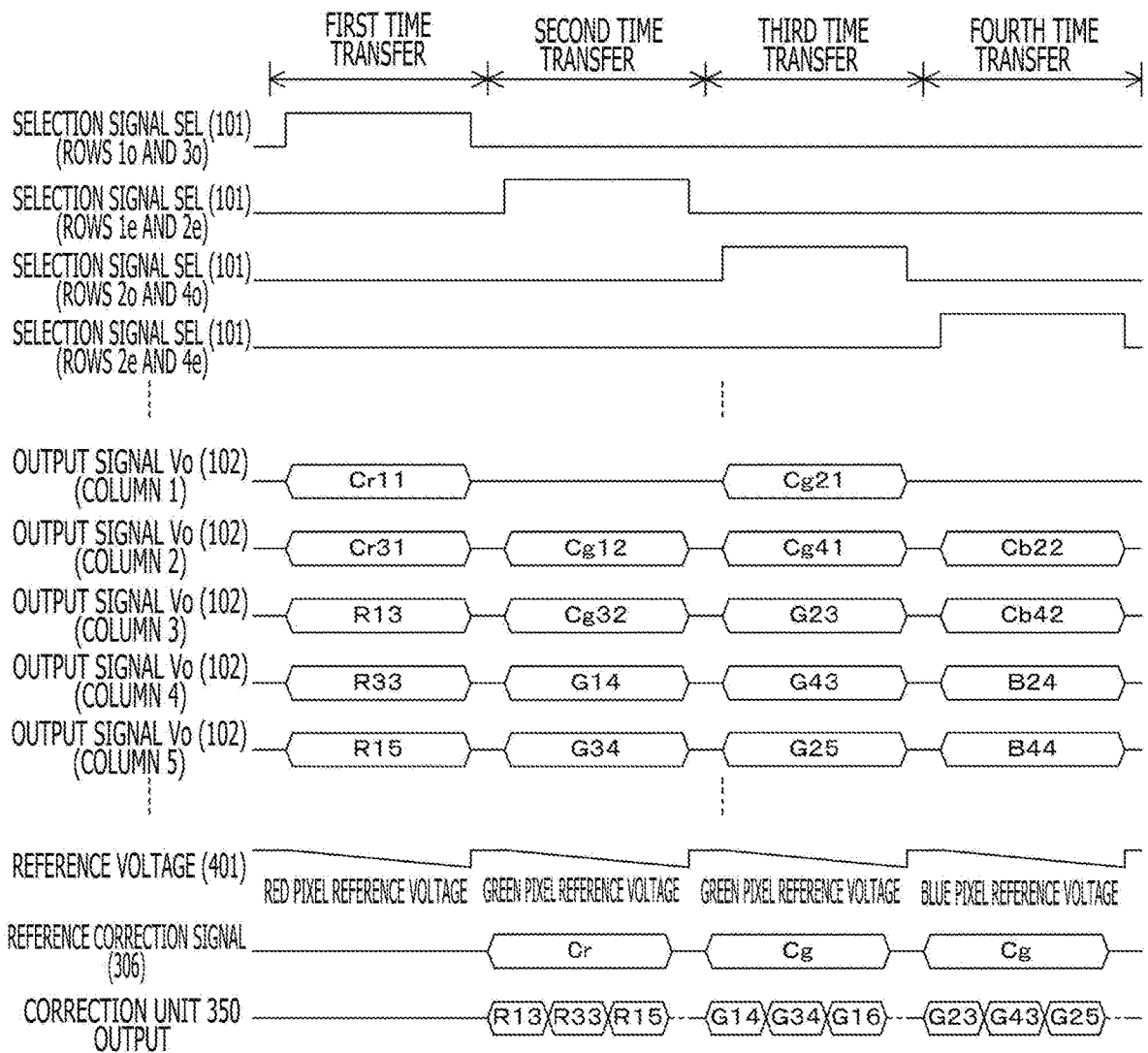
FIG. 9 is a view depicting an example of processing of the solid-state image pickup apparatus 10 in the first embodiment of the present technology.

FIG. 9 is a view depicting an example of processing of the solid-state image pickup apparatus 10 in the first embodiment of the present technology. The figure represents a procedure in which digital image signals and so forth outputted from the pixels 110 and so forth are processed by the column signal processing unit 300. Further, the figure represents a relation among the selection signals SEL outputted to the row signal lines 101, output signals (analog image signals or analog correction signals) Vo outputted from the pixels and so forth to the column signal lines 102, reference voltage, reference correction signal and output of the correction unit 350. It is to be noted that "1o" and so forth described for the selection signals SEL in the figure represent numbers of the row signal lines 101 and row signal lines for odd-numbered columns or row signal lines for even-numbered columns. For example, "1o" and "2e" represent the "row signal line 101 of the first row for an odd-numbered column" and the "row signal line 101 of the second row for an even-numbered column," respectively. Further, "column 1" or the like described for the output signal Vo represents the number of a column signal line.

[Transfer for the First Time]

First, an on signal is inputted to the selection signal lines SEL of the row signal line 101 of the first row for odd-numbered columns and the row signal line 101 of the third row for odd-numbered columns. Consequently, image signals and so forth are outputted to the column signal lines 102. Here, "Cr11" or the like described in the figure represents a type of an output signal and a position of a pixel or the like that outputs the output signal. "Cr," "Cg," "Cb," "R," "G" and "B" represent signals generated by red correction pixels, green correction pixels, blue correction pixels, red pixels, green pixels and blue pixels, respectively. Further, the position of a pixel or the like is represented by a combination of row and column numbers in the pixel array unit 100. For example, "Cr11" represents a signal outputted from a red correction pixel arranged in the first row in the first column. In the transfer for the first time, "Cr11," "Cr31," "R13," "R33," "R15" and so forth are outputted. In particular, analog correction signals and analog image signals generated by red correction pixels and red pixels are outputted.

A red pixel reference voltage is outputted from the reference voltage generation unit 400 such that analog to digital conversion is performed by the analog to digital conversion units 320, and digital image signals obtained by the conversion are held by the holding units 323 of the respective analog to digital conversion units 320. The transfer for the first time ends therewith. It is to be noted that the digital image signals held by the analog to digital conversion units 320 are transferred horizontally upon later transfer for the second time. Then, correction based on the reference correction signal (described as "Cr" in the figure) generated from "Cr11" and "Cr31" outputted from the correction pixels in the transfer for the first time is performed by the correction unit 350. "R13" and so forth described at the correction unit 350 output in the figure represent digital image signals after correction corresponding to the output signals "R13."

[Transfer for the Second Time]

Then, an on signal is inputted to the selection signal lines SEL of the row signal line 101 of the first row for even-numbered columns and the row signal line 101 of the third row for even-numbered columns. Consequently, to the column signal lines 102, "Cg12," "Cg32," "G14," "G34" and so forth are outputted. In particular, in the transfer for the second time, analog correction signals and analog image signals generated by green correction pixels and green pixels are outputted. A green pixel reference voltage is outputted from the reference voltage generation unit 400 such that analog to digital conversion is performed by the analog to digital conversion units 320. Thereafter, the digital image signals after conversion are horizontally transferred in transfer for the third time and corrected by the correction unit 350. Thereupon, correction based on the reference correction signal (described as "Cg" in the figure) generated from "Cg12" and "Cg32" outputted from correction pixels in the transfer for the second time is performed.

[Transfer for the Third Time]

Then, an on signal is inputted to the selection signal lines SEL of the row signal line 101 of the second row for odd-numbered columns and the row signal line 101 of the fourth row for odd-numbered columns, and "Cg21," "Cg41," "G23," "G43," "G25" and so forth are outputted. In particular, correction signals and image signals generated by green correction pixels and green pixels are outputted. Further, as for a correction signal, a reference correction signal based on "Cg21" and "Cg41" is outputted. Since the reference voltage and an output of the correction unit 350 are similar to those upon transfer for the second time, description of them is omitted.

[Transfer for the Fourth Time]

Then, an on signal is inputted to the selection signal lines SEL of the row signal line 101 of the second row for even-numbered columns and the row signal line 101 of the fourth row for even-numbered columns, and "Cb22," "Cb42," "B24," "B44" and so forth are outputted. In particular, analog correction signals and analog image signals generated by blue correction pixels and blue pixels are outputted. Further, as for a correction signal, a reference correction signal based on "Cb22" and "Cb42" is outputted. Description of a reference voltage and an output of the correction unit 350 is omitted.

Such outputting of analog image signals and so forth from pixels and so forth arranged in two rows, analog to digital conversion and correction as described above are performed for all of the pixels and the correction pixels, and image signals for one screen image are outputted from the solid-state image pickup apparatus 10. Further, in the first embodiment of the present technology, correction of digital image signals is performed on the basis of correction pixels arranged in two rows. In other words, correction is performed on the basis of analog correction signals outputted from correction pixels equal in number to twice the number of correction pixels arranged in one row.

As described hereinabove with reference to FIG. 3, a reference correction signal is generated from an average value of digital correction signals. Normally, a digital correction signal includes, in addition to noise of a same phase that mixes upon analog to digital conversion, noise components generated at random in individual pixels. By calculating an average value of digital correction signals, noise components generated at random in individual pixels can be compressed. Meanwhile, since noise of a same phase that mixes upon analog to digital conversion has a substantially same value in individual digital correction signals, it has a same value also after calculation of an average value. Therefore, by calculation of an average value, the level of noise generated at random in individual pixels with respect to the noise of a same phase that mixes upon analog to digital conversion can be lowered. In order to acquire a more accurate noise value upon analog to digital conversion, it is necessary to increase the number of parameters for average value calculation. In the solid-state image pickup apparatus 10 of the embodiment of the present technology, analog correction signals outputted from correction pixels equal in number to twice the number of correction pixels arranged in one row can be used. Therefore, acquisition of noise correction signal values for which the level of noise generated at random in individual pixels is lowered and that include a reduced dispersion becomes possible. Alternatively, in the case in which the number of correction pixels arranged in the pixel array unit 100 is reduced to ½, noise correction signal values similar to those acquired by a solid-state image pickup apparatus of a conventional mode can be acquired.

[Configuration of Sorting Unit]

Figure 10:
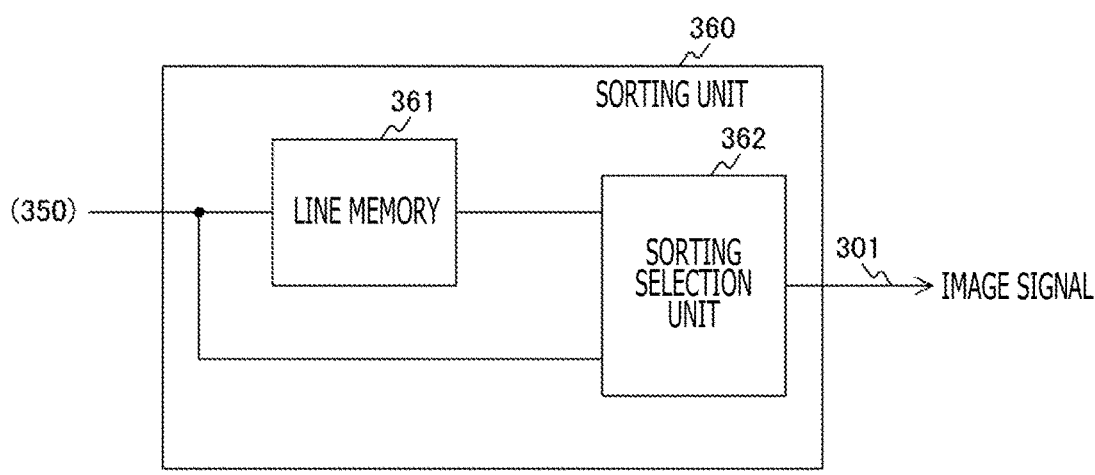
FIG. 10 is a view depicting an example of a configuration of a sorting unit 360 in the first embodiment of the present technology.

FIG. 10 is a view depicting an example of a configuration of the sorting unit 360 in the first embodiment of the present technology. This sorting unit 360 includes a line memory 361 and a sorting selection unit 362.

The line memory 361 holds digital image signals outputted from the correction unit 350.

The sorting selection unit 362 selects and outputs digital image signals held in the line memory 361 and digital image signals outputted from the correction unit 350.

As described hereinabove with reference to FIG. 9, in the first embodiment of the present technology, digital image signals generated by red pixels for two rows are horizontally transferred and outputted, and then digital image signals based on green pixels for two rows are horizontally transferred and outputted. In this manner, the digital image signals are outputted in an order different from that of the arrangement of the pixels 110 to 140 in the pixel array unit 100. The sorting unit 360 performs sorting of the digital image signals.

[Processing of Sorting Unit]

Figure 11:
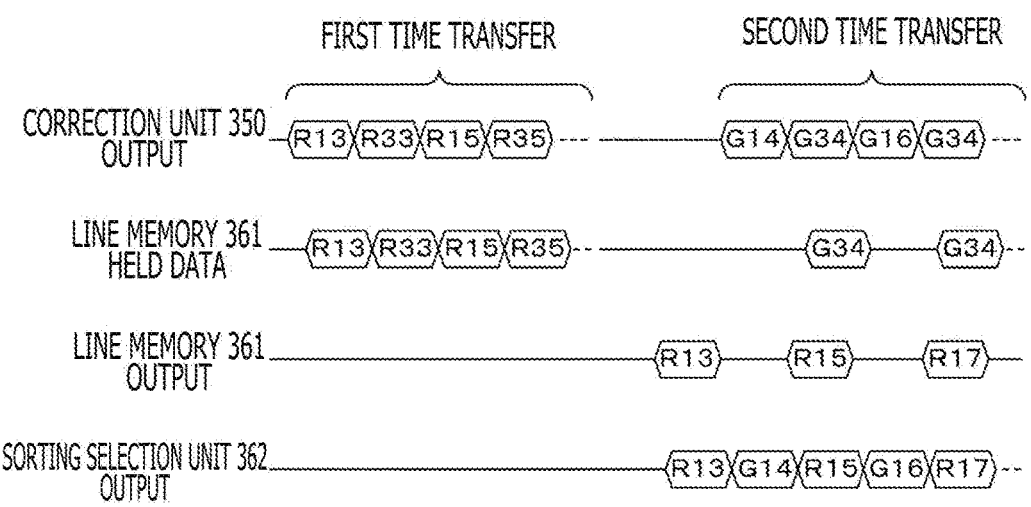
FIG. 11 is a view depicting an example of processing of the sorting unit 360 in the first embodiment of the present technology.

FIG. 11 is a view depicting an example of processing of the sorting unit 360 in the first embodiment of the present technology. The figure represents a relation among an output of the correction unit 350, held data in the line memory 361, an output of the line memory 361 and an output of the sorting selection unit 362.

In the first time transfer represented in the figure, "R13" and so forth are outputted from the correction unit 350. The line memory 361 holds the "R13" and so forth. In the second time transfer, "G14" and so forth are outputted from the correction unit 350. The line memory 361 outputs the held "R13" and so forth in synchronism with the second time transfer. The sorting selection unit 362 alternately selects and outputs the "R13" and so forth and the "G14" and so forth. Consequently, digital image signals of a sequence same as that of the arrangement of the pixels 110 to 140 in the pixel array unit 100 can be outputted.

[Image Signal Generation Process]

Figure 12:
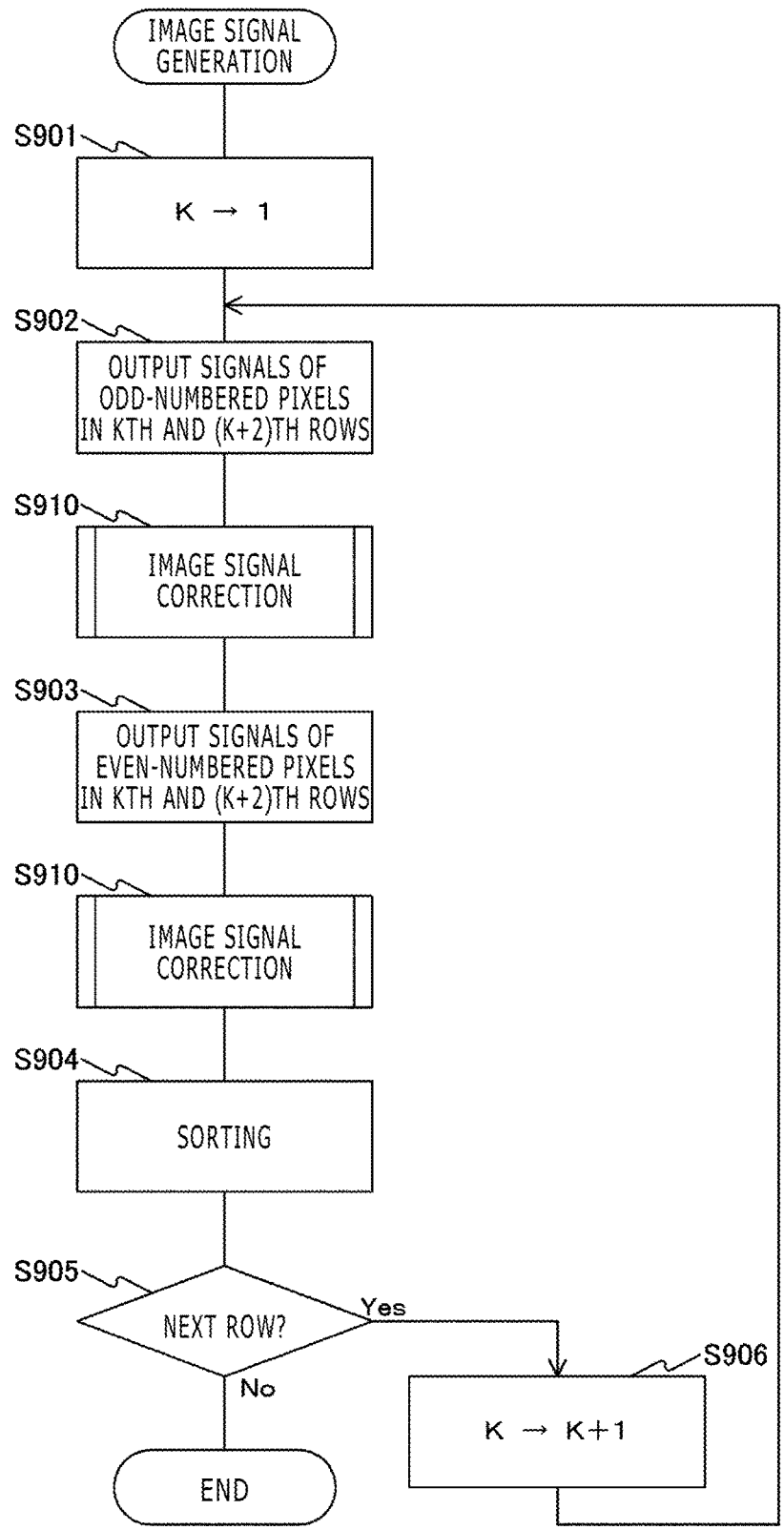
FIG. 12 is a view depicting an example of an image signal generation process in the first embodiment of the present technology.

FIG. 12 is a view depicting an example of an image signal generation process in the first embodiment of the present technology. In the figure, K is a variable representative of a number of a row in the pixel array unit 100. First, K is initialized to the value "1" (step S901). Then, the solid-state image pickup apparatus 10 causes signals to be outputted from pixels and correction pixels arranged in odd-numbered columns from among pixels and correction pixels arranged in the Kth and (K+2)th rows (step S902). In other words, the solid-state image pickup apparatus 10 causes analog image signals and analog correction signals to be outputted. Then, the solid-state image pickup apparatus 10 performs an image signal correction process for the outputted signals (step S910) to generate corrected digital image signals. Then, the solid-state image pickup apparatus 10 causes signals to be outputted from pixels and correction pixels arranged in even-numbered columns from among the pixels and the correction pixels in the Kth and (K+2)th rows (step S903). Then, the solid-state image pickup apparatus 10 performs correction of the analog image signals (step S910) to generate corrected digital image signals. Then, the solid-state image pickup apparatus 10 performs sorting of the corrected digital image signals (step S904).

Then, the solid-state image pickup apparatus 10 decides whether or not generation of corrected digital image signals has been performed for all rows (step S905). If it is decided that generation has been performed for all rows (step S905: No), then the solid-state image pickup apparatus 10 ends the image signal generation process. On the other hand, if a next row exists (step S905: Yes), then the solid-state image pickup apparatus 10 performs incrementing of K (step S906) and executes the processes beginning with step S902 again.

[Image Signal Correction Process]

Figure 13:
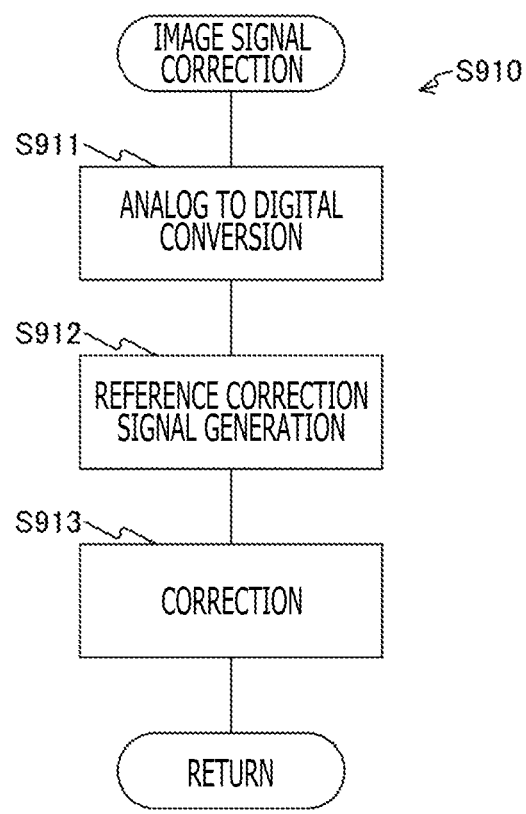
FIG. 13 is a view depicting an example of an image signal correction process (step S910) in the first embodiment of the present technology.

FIG. 13 is a view depicting an example of the image signal correction process (step S910) in the first embodiment of the present technology. First, the solid-state image pickup apparatus 10 performs analog to digital conversion for analog image signals and analog correction signals outputted from pixels and correction pixels (step S911). Then, the solid-state image pickup apparatus 10 generates a reference correction signal on the basis of the digital correction signals (step S912). Then, the solid-state image pickup apparatus 10 performs correction of the digital image signals on the basis of the reference correction signal (step S913). Thereafter, the solid-state image pickup apparatus 10 ends the image signal correction process.

In this manner, with the first embodiment of the present technology, by performing correction using correction pixels for two rows simultaneously, the number of correction pixels per one row can be reduced to one half, and the number of correction pixels to be arranged in the pixel array unit 100 can be reduced.

2. Second Embodiment

In the embodiment described above, outputting of analog image signals is individually performed from red pixels, green pixels and blue pixels. In contrast, in a second embodiment of the present technology, outputting of analog image signals is performed simultaneously from two different kinds of pixels arranged in a row. Consequently, generation of image signals by the solid-state image pickup apparatus 10 is performed at a high speed.

[Configuration of Solid-State Image Pickup Apparatus]

Figure 14:
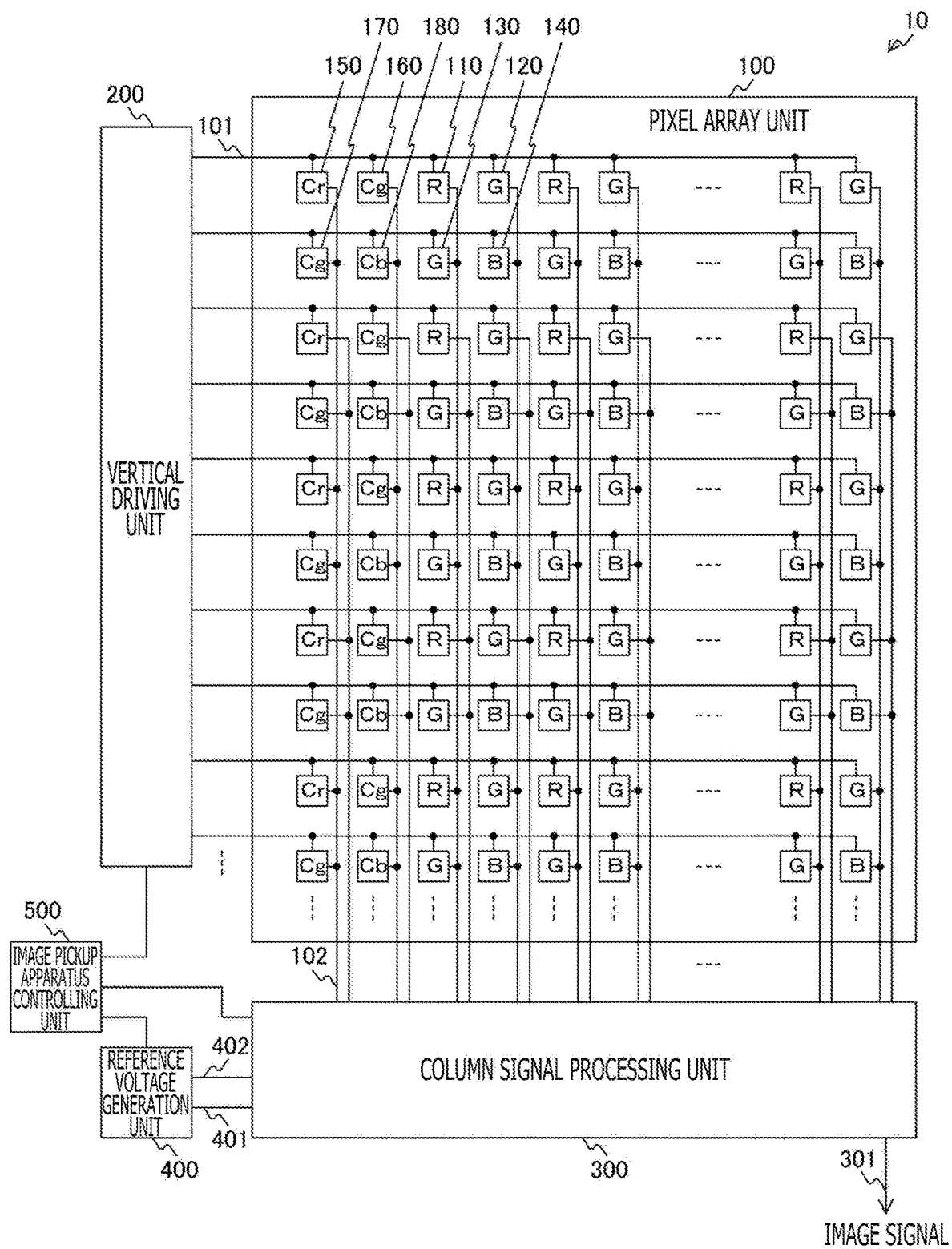
FIG. 14 is a view depicting an example of a configuration of a solid-state image pickup apparatus 10 in a second embodiment of the present technology.

FIG. 14 is a view depicting an example of a configuration of a solid-state image pickup apparatus 10 in the second embodiment of the present technology. The solid-state image pickup apparatus 10 of FIG. 14 is different in comparison with the solid-state image pickup apparatus 10 described hereinabove with reference to FIG. 1 in arrangement of the row signal lines 101 and the column signal lines 102 in the pixel array unit 100 and wiring to the pixels 110 and so forth. The row signal lines 101 are arranged one for each row, and the pixels 110 to 140 and the correction pixels 150 to 180 arranged in a row are all wired to the same row signal line 101. Meanwhile, the column signal lines 102 are arranged two for each column, and the pixels and so forth are connected to different ones of the column signal lines 102 for every two rows. In other words, column signal lines 102 equal in number to twice the number in the pixel array unit 100 depicted in FIG. 1 are arranged. Upon outputting of analog image signals and so forth, analog image signals and so forth are outputted simultaneously from all pixels and so forth arranged in one row. Describing taking the first row as an example, analog image signals and so forth from red correction pixels (correction pixels 150), green correction pixels (correction pixels 160), red pixels (pixels 110) and green pixels (pixels 120) are outputted simultaneously. The configuration of the other part of the solid-state image pickup apparatus 10 is similar to that of the solid-state image pickup apparatus 10 described hereinabove with reference to FIG. 1, and therefore, description of the same is omitted.

[Configuration of Column Signal Processing Unit]

Figure 15:
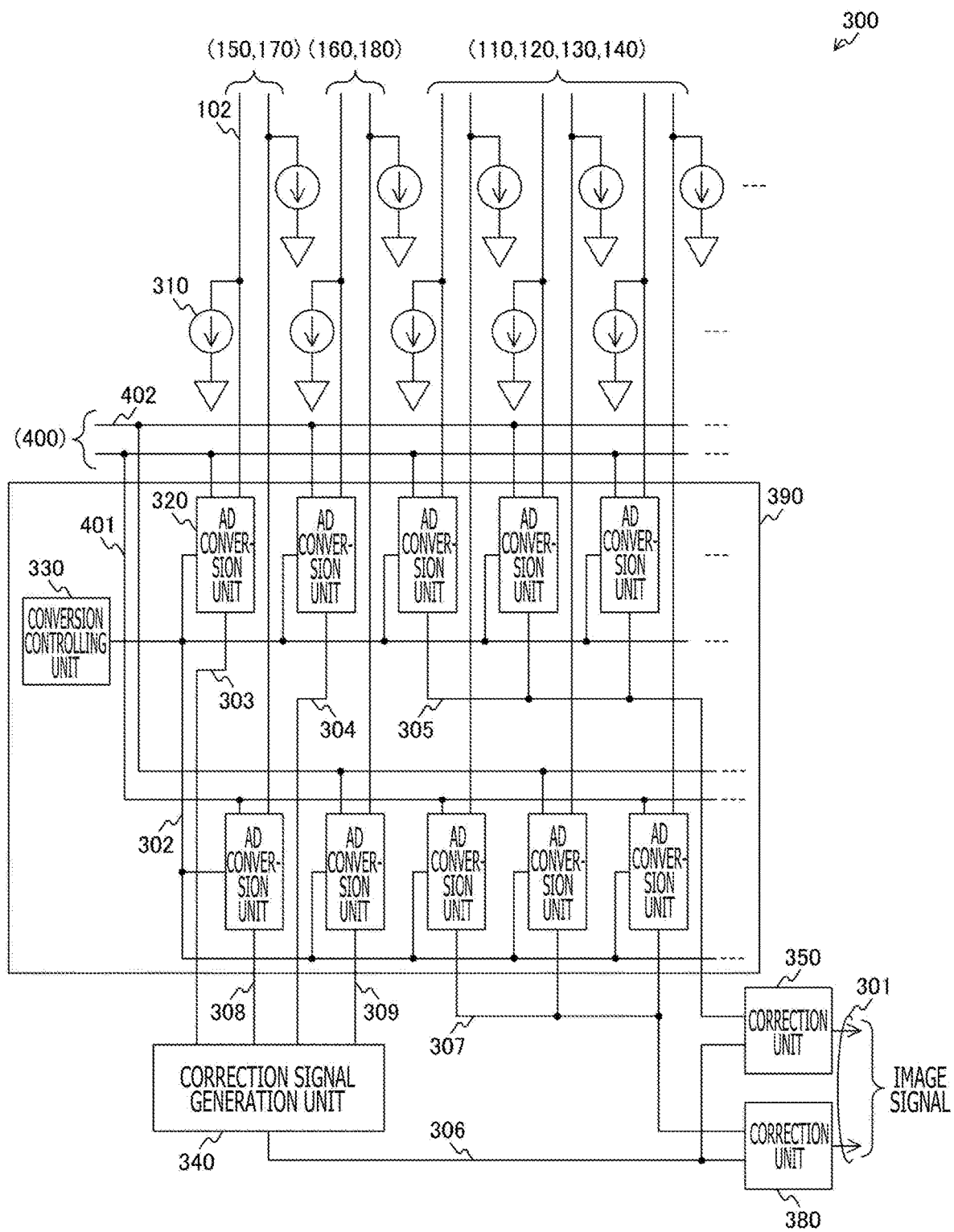
FIG. 15 is a view depicting an example of a configuration of a column signal processing unit 300 in the second embodiment of the present technology.

FIG. 15 is a view depicting an example of a configuration of the column signal processing unit 300 in the second embodiment of the present technology. The column signal processing unit 300 in the figure is different from the column signal processing unit 300 described hereinabove with reference to FIG. 3 in that it further includes a correction unit 380. It is to be noted that the sorting unit 360 is omitted from the column signal processing unit 300 of the figure.

In the conversion unit 390, each analog to digital conversion unit 320 is connected to a column signal line 102 similarly as in the conversion unit 390 described hereinabove with reference to FIG. 3. A signal line 401 is connected, from among the analog to digital conversion units 320, to analog to digital conversion units 320 to which column signal lines 102 wired to pixels and so forth arranged in odd-numbered columns are connected. Meanwhile, to analog to digital conversion units 320 to which column signal lines 102 wired to pixels and so forth arranged in even-numbered columns are connected, a signal line 402 is connected. Outputs of the analog to digital conversion units 320 connected to column signal lines 102 (first to fourth column signal lines 102) to which only correction pixels (correction pixels 150 to 180) are wired are connected to inputs of the correction signal generation unit 340.

They are connected by signal lines 303, 304, 308 and 309. In particular, the output of the analog to digital conversion unit 320 to which the first column signal line 102 is connected is connected to an input of the correction signal generation unit 340 through the signal line 303. The output of the analog to digital conversion unit 320 to which the second column signal line 102 is connected is connected to another input of the correction signal generation unit 340 through the signal line 308. The output of the analog to digital conversion unit 320 to which the third column signal line 102 is connected is connected to a further input of the correction signal generation unit 340 through the signal line 304. The output of the analog to digital conversion unit 320 to which the fourth column signal line 102 is connected is connected to a still further input of the correction signal generation unit 340 through the signal line 309.

To the outputs of the analog to digital conversion units 320 to which odd-numbered column signal lines 102 are connected from among the analog to digital conversion units 320 other than those described above, a signal line 305 is connected in common and is connected to an input of the correction unit 350. Meanwhile, to the analog to digital conversion units 320 to which even-numbered column signal lines 102 are connected, a signal line 307 is connected in common and is connected to an input of the correction unit 380. Further, a signal line 306 is connected to the correction unit 380 such that digital image signals and reference correction signals transferred horizontally are inputted.

In this manner, the column signal processing unit 300 of the second embodiment of the present technology is configured such that it has two sets of analog to digital conversion units and a correction unit: a set of a plurality of analog to digital conversion units 320 to which the odd-numbered column signal lines 102 are connected and the correction unit 350; and another set of a plurality of analog to digital conversion units 320 to which even-numbered column signal lines 102 are connected and the correction unit 380. As hereinafter described, processing by the two sets of analog to digital conversion units and a correction unit is performed simultaneously in parallel. Further, the analog to digital conversion units 320 in the individual sets perform first conversion for analog image signals outputted from pixels corresponding to light of a same wavelength. The configuration of the other part of the column signal processing unit 300 is similar to that of the column signal processing unit 300 described hereinabove with reference to FIG. 3, and therefore, description of the same is omitted.

[Configuration of Correction Signal Generation Unit]

Figure 16:
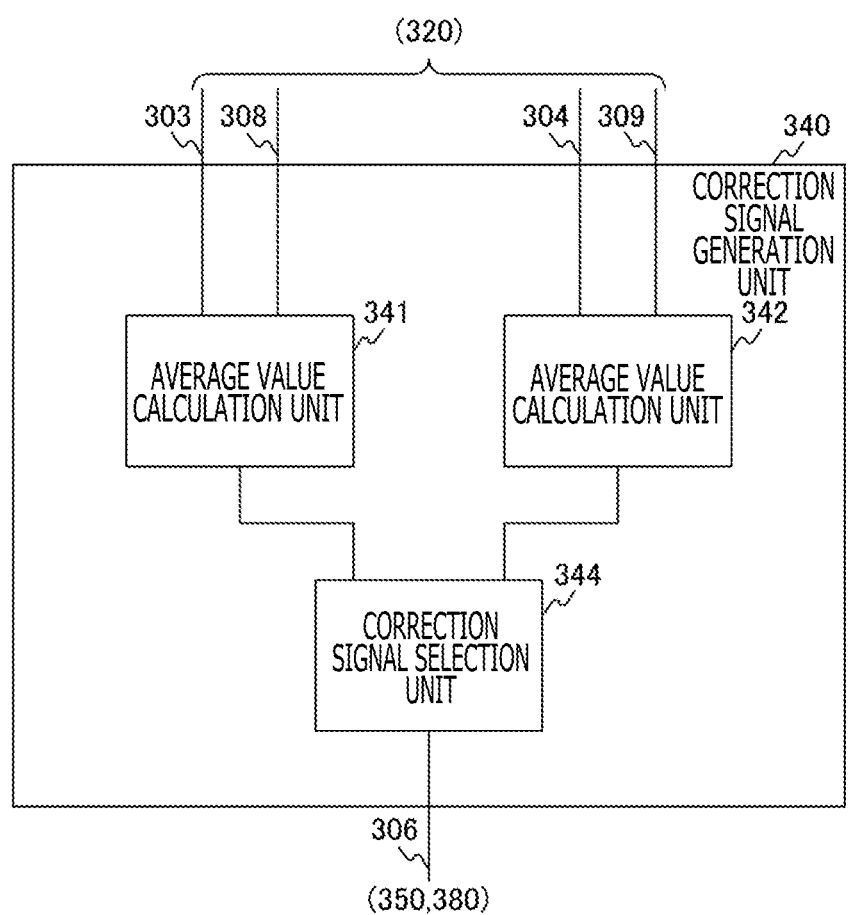
FIG. 16 is a view depicting an example of a configuration of a correction signal generation unit 340 in the second embodiment of the present technology.

FIG. 16 is a view depicting an example of a configuration of the correction signal generation unit 340 in the second embodiment of the present technology. This correction signal generation unit 340 includes average value calculation units 341 and 342 and a correction signal selection unit 344.

To the average value calculation unit 341, signal lines 303 and 308 are connected. As depicted in FIG. 15, to the signal lines, digital correction signals based on analog correction signals from red correction pixels (correction pixels 150) and green correction pixels (correction pixels 170) are outputted. This average value calculation unit 341 calculates an average value of digital correction signals based on red correction pixels (correction pixels 150) and green correction pixels (correction pixels 170).

To the average value calculation unit 342, signal lines 304 and 309 are connected. To the signal lines, digital correction signals based on analog correction signals from green correction pixels (correction pixels 160) and blue correction pixels (correction pixels 180) are outputted. This average value calculation unit 341 calculates an average value of digital correction signals based on green correction pixels (correction pixels 160) and blue correction pixels (correction pixels 180).

The correction signal selection unit 344 selects and outputs digital correction signals calculated by the average value calculation units 341 and 342 similarly to the correction signal selection unit 343. This correction signal selection unit 344 selects and outputs digital correction signals according to a type of a digital image signal that is to be made a target of correction in the correction unit 350. As depicted in FIG. 14, in the second embodiment of the present technology, two different types of analog image signals arranged in rows of the pixel array unit 100 are outputted simultaneously and then are converted and horizontally transferred. Therefore, the correction signal selection unit 344 selects outputs of the average value calculation units 341 and 342 in response to a type of a digital image signal to be transferred horizontally.

[Configuration of Reference Voltage Generation Unit]

Figure 17:
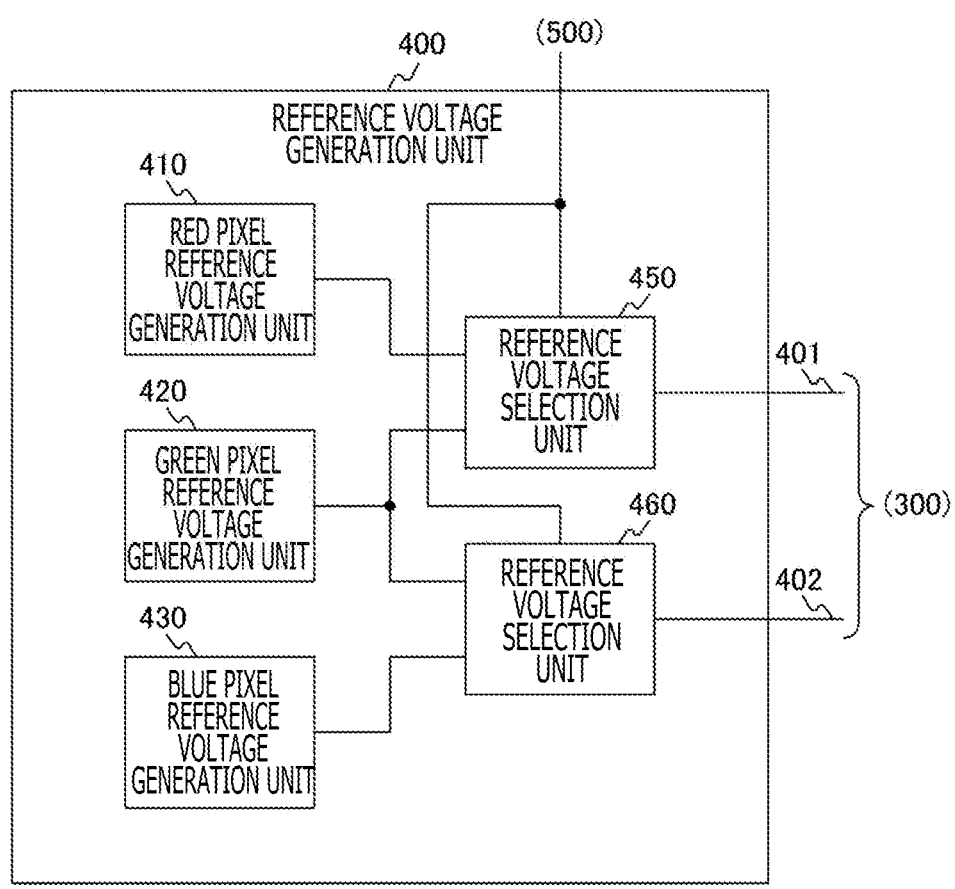
FIG. 17 is a view depicting an example of a configuration of a reference voltage generation unit 400 in the second embodiment of the present technology.

FIG. 17 is a view depicting an example of a configuration of the reference voltage generation unit 400 in the second embodiment of the present technology. This reference voltage generation unit 400 is different from the reference voltage generation unit 400 described hereinabove with reference to FIG. 8 in that it includes reference voltage selection units 450 and 460 in place of the reference voltage selection unit 440.

The reference voltage selection unit 450 selects reference voltages generated by the red pixel reference voltage generation unit 410 and the green pixel reference voltage generation unit 420. The reference voltage selection unit 460 selects reference voltages generated by the green pixel reference voltage generation unit 420 and the blue pixel reference voltage generation unit 430.

In this manner, the reference voltage generation unit 400 of the figure outputs two reference voltages selected by the reference voltage selection units 450 and 460 to signal lines 401 and 402, respectively. Thereupon, operation of the reference signal generation unit that is not selected can be stopped. By this, reduction of the power consumption can be performed.

[Processing of Image Pickup Apparatus]

Figure 18:
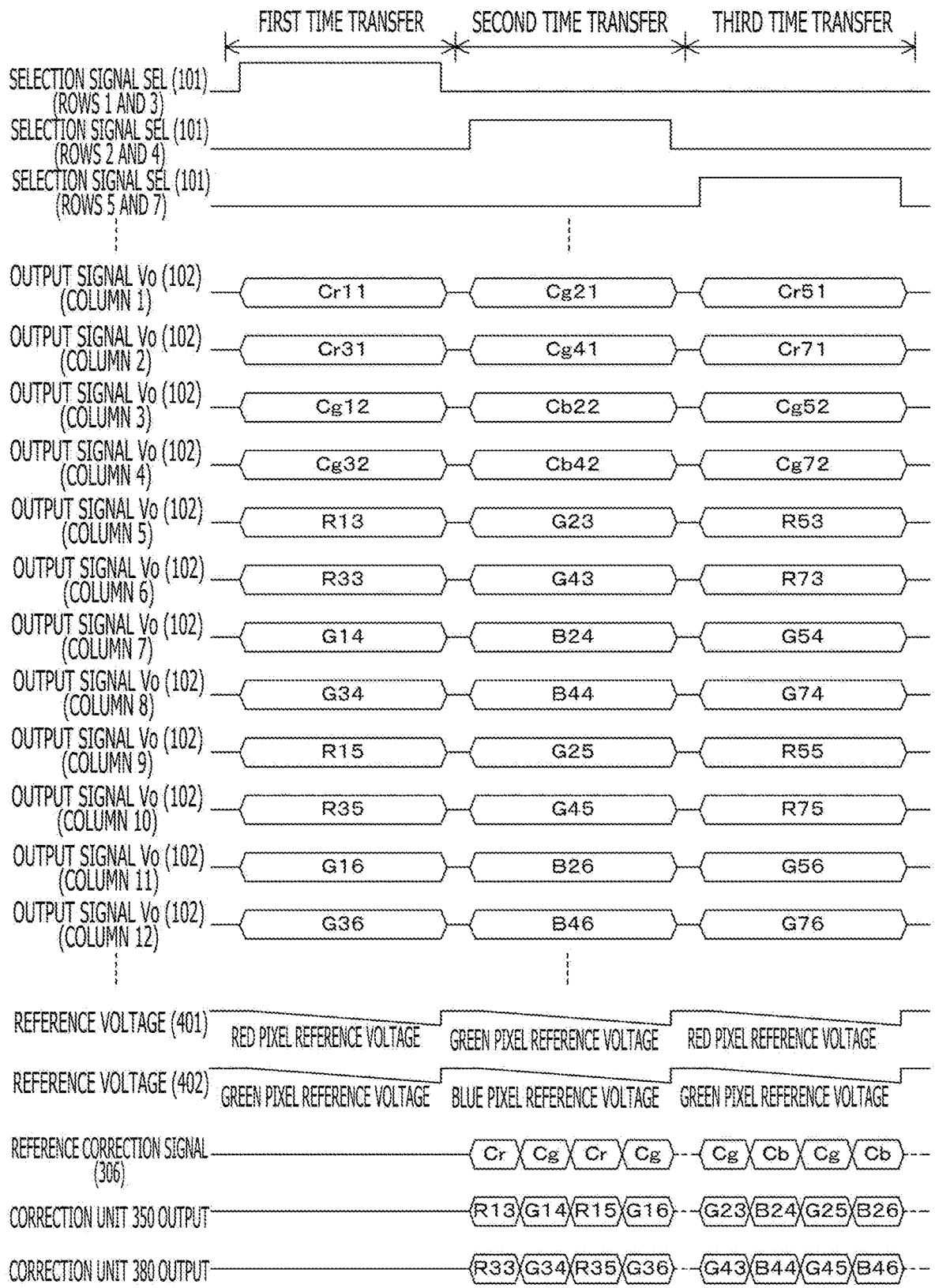
FIG. 18 is a view depicting an example of processing of the solid-state image pickup apparatus 10 in the second embodiment of the present technology.

FIG. 18 is a view depicting an example of processing of the solid-state image pickup apparatus 10 in the second embodiment of the present technology. The figure represents a relation among the selection signals SEL outputted to the row signal lines 101, output signals (analog image signals or analog correction signals) Vo outputted from pixels and so forth to the column signal lines 102, reference voltages, a reference correction signal and outputs of the correction units 350 and 380.

[Transfer for the First Time]

First, an on signal is inputted to the selection signal lines SEL of the row signal lines 101 of the first and third rows. Consequently, "Cr11," "Cr31," "Cg12," "Cg32," "R13," "R33," "G14," "G34" and so forth are outputted to the column signal lines 102. In particular, in the transfer for the first time, analog correction signals and analog image signals generated by red correction pixels, green correction pixels, red pixels and green pixels are outputted. A red pixel reference voltage and a green pixel reference voltage are outputted from the reference voltage generation unit 400, and analog to digital conversion is performed by the analog to digital conversion unit 320. Thereafter, the converted digital image signals are horizontally transferred upon transfer for the second time and are corrected by the correction units 350 and 380. Thereupon, the reference correction signals Cr and Cg are outputted alternately from the correction signal generation unit 340, and correction based on them is performed.

[Transfer for the Second Time]

Then, an on signal is inputted to the selection signal lines SEL of the row signal lines 101 of the second and fourth rows, and "Cg21," "Cg41," "Cb22," "Cb42," "G23," "G43," "B24," "B44" and so forth are outputted to the column signal lines 102. In particular, in the transfer for the second time, signals generated by green correction pixels, blue correction pixels, green pixels and blue pixels are outputted. A green pixel reference voltage and a blue pixel reference voltage are outputted from the reference voltage generation unit 400, and analog to digital conversion is performed by the analog to digital conversion unit 320. Thereafter, the converted digital image signals are horizontally transferred upon transfer for the third time and are corrected by the correction units 350 and 380. Thereupon, the reference correction signals Cg and Cb are outputted alternately from the correction signal generation unit 340.

[Transfer for the Third Time]

Then, an on signal is inputted to the selection signal lines SEL of the row signal lines 101 of the fifth and seventh rows, and "Cr51," "Cr71," "Cg52," "Cg72," "R53," "R73," "G54," "G74" and so forth are outputted. Reference voltages, a reference correction signal and operation of the correction units 350 and 380 are similar to those upon transfer for the first time, and therefore, description of them is omitted.

Generation of image signals is performed by such processes as described above. In the solid-state image pickup apparatus 10 of the second embodiment of the present technology, two column signal lines 102 are arranged for each column in the pixel array unit 100, and analog image signals and so forth equal in number to twice that in the first embodiment of the present technology are outputted. The column signal processing unit 300 has two sets of analog to digital conversion units and a correction unit and executes processing of the analog image signals at a high speed. It is to be noted that also it is possible to perform sorting of horizontally transferred digital image signals similarly as in the solid-state image pickup apparatus 10 of the first embodiment of the present technology.

In this manner, with the second embodiment of the present technology, two column signal lines 102 are arranged for each column in the pixel array unit 100, and analog image signals of all pixels arranged in two rows are transmitted simultaneously. Further, the column signal processing unit 300 has two sets of analog to digital conversion units and a correction unit and performs such processes as described above in parallel. Consequently, high speed generation of image signals can be performed.

3. Third Embodiment

In the first embodiment described hereinabove, one column signal line is arranged for each column such that transmission of analog image signals and so forth is performed through the column signal line. In contrast, in a third embodiment of the present technology, two column signal lines are arranged for each column to transmit analog image signals. Consequently, generation of image signals in the solid-state image pickup apparatus 10 is performed at a high speed.

[Configuration of Solid-State Image Pickup Apparatus]

Figure 19:
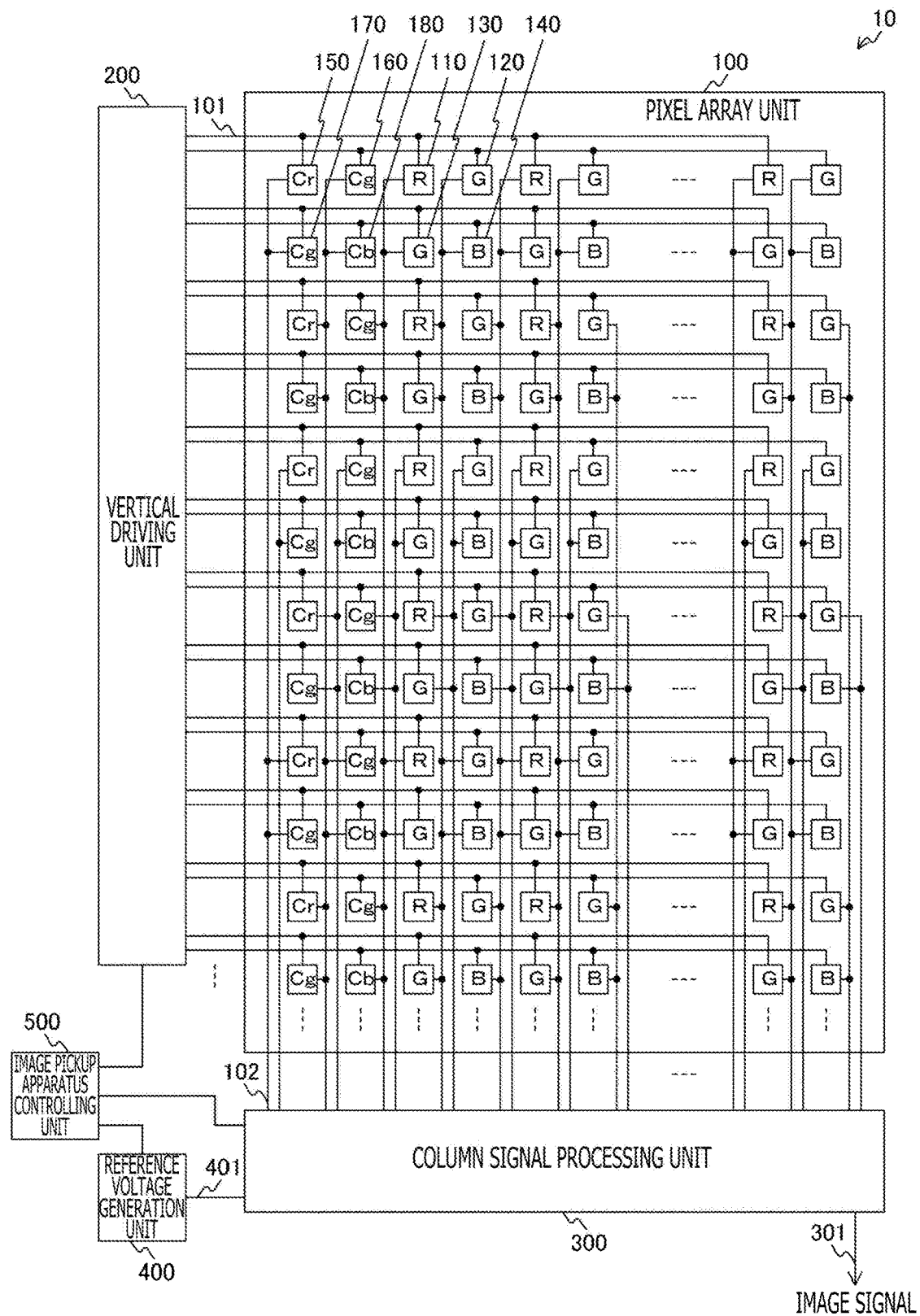
FIG. 19 is a view depicting an example of a configuration of a solid-state image pickup apparatus 10 in a third embodiment of the present technology.

FIG. 19 is a view depicting an example of a configuration of the solid-state image pickup apparatus 10 in the third embodiment of the present technology. The solid-state image pickup apparatus 10 of the figure is different in comparison with the solid-state image pickup apparatus 10 described hereinabove with reference to FIG. 1 in arrangement of the column signal lines 102 in the pixel array unit 100 and wiring to the pixel 110 and so forth. For each column, two column signal lines 102 are arranged, and pixels and so forth are connected to different ones of the column signal lines 102 for every two rows. Upon outputting of analog image signals and so forth, analog image signals and so forth are outputted simultaneously from pixels and so forth arranged in four rows. For example, analog image signals and so forth from the red correction pixels (correction pixels 150) and the red pixels (pixels 110) arranged in the first row, third row, fifth row and seventh row are outputted simultaneously. The configuration of the other part of the solid-state image pickup apparatus 10 is similar to that of the solid-state image pickup apparatus 10 described hereinabove with reference to FIG. 1, and therefore, description of the same is omitted.

[Configuration of Column Signal Processing Unit]

Figure 20:
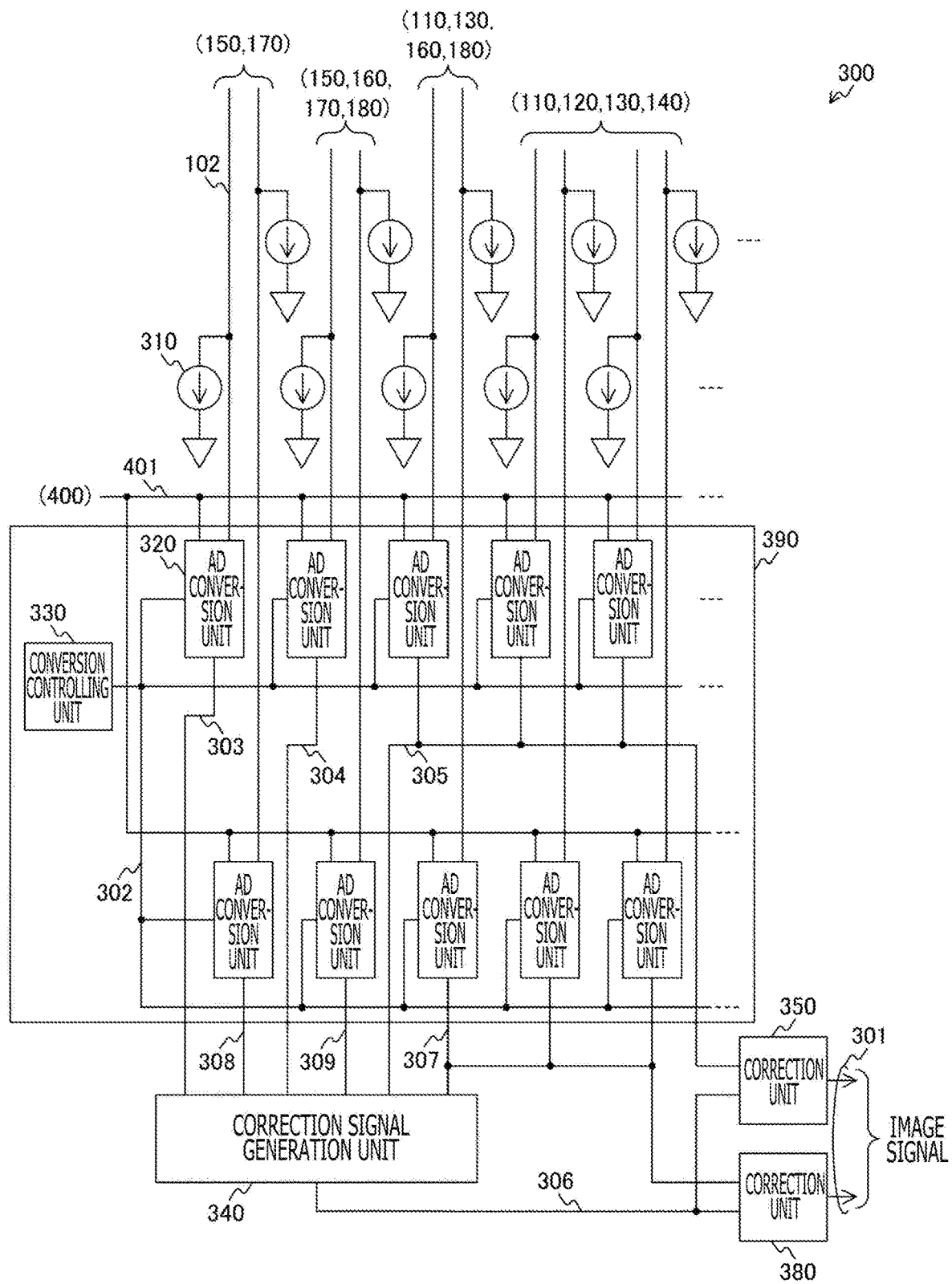
FIG. 20 is a view depicting an example of a configuration of a column signal processing unit 300 in the third embodiment of the present technology.

FIG. 20 is a view depicting an example of a configuration of the column signal processing unit 300 in the third embodiment of the present technology. The column signal processing unit 300 of the figure is different in comparison with the column signal processing unit 300 described hereinabove with reference to FIG. 15 in wiring of the analog to digital conversion units 320 and the correction signal generation unit 340.

To all of the analog to digital conversion units 320, a common reference voltage is supplied through a signal line 401. To inputs of the correction signal generation unit 340, signal lines 305 and 307 are connected in addition to the signal lines 303, 304, 308 and 309. The configuration of the other part of the column signal processing unit 300 is similar to that of the column signal processing unit 300 described hereinabove with reference to FIG. 15, and therefore, description of the same is omitted.

[Configuration of Correction Signal Generation Unit]

Figure 21:
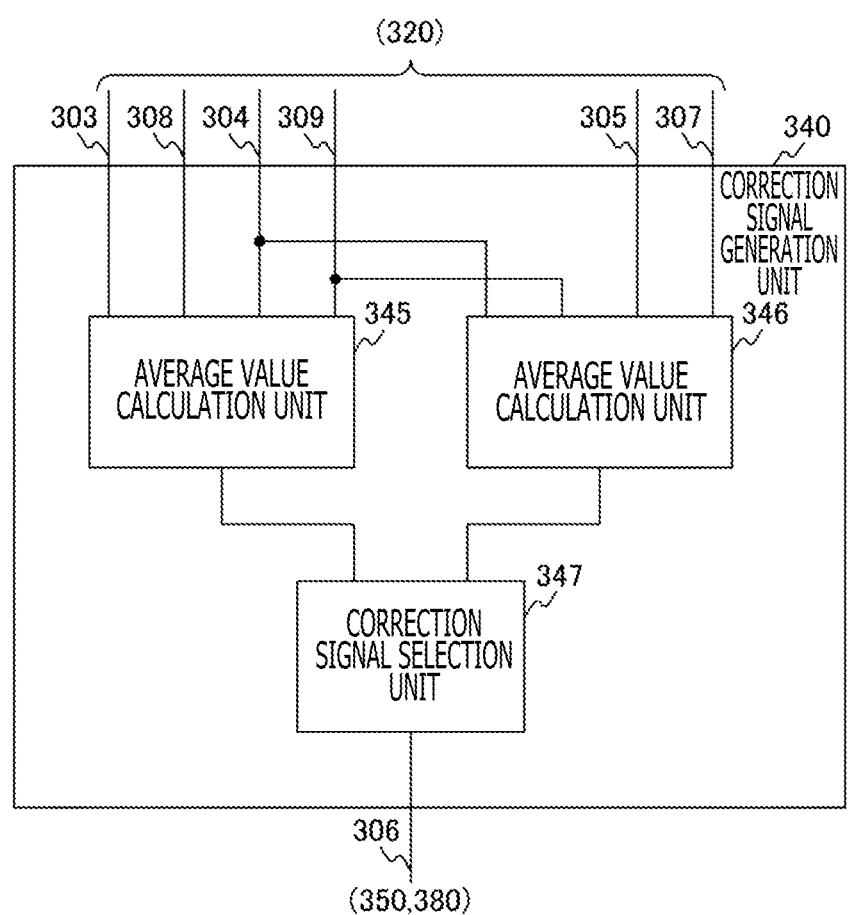
FIG. 21 is a view depicting an example of a configuration of a correction signal generation unit 340 in the third embodiment of the present technology.

FIG. 21 is a view depicting an example of a configuration of the correction signal generation unit 340 in the third embodiment of the present technology. This correction signal generation unit 340 includes average value calculation units 345 and 346 and a correction signal selection unit 347.

To the average value calculation unit 345, the signal lines 303, 304, 308 and 309 are connected. As depicted in FIG. 20, to the signal lines, digital correction signals based on analog correction signals from red correction pixels (correction pixels 150) and green correction pixels (correction pixels 170) are outputted. The average value calculation unit 345 calculates an average value of digital correction signals based on the red correction pixels and the green correction pixels.

To the average value calculation unit 346, the signal lines 304, 305, 307 and 309 are connected. To the signal lines, digital correction signals based on analog correction signals from green correction pixels (correction pixels 160) and blue correction pixels (correction pixels 180) are outputted. The average value calculation unit 346 calculates an average value of the digital correction signals based on the green correction pixels and the blue correction pixels.

The correction signal selection unit 347 selects and outputs digital correction signals calculated by the average value calculation units 345 and 346 similarly to the correction signal selection unit 343.

[Processing of Image Pickup Apparatus]

Figure 22:
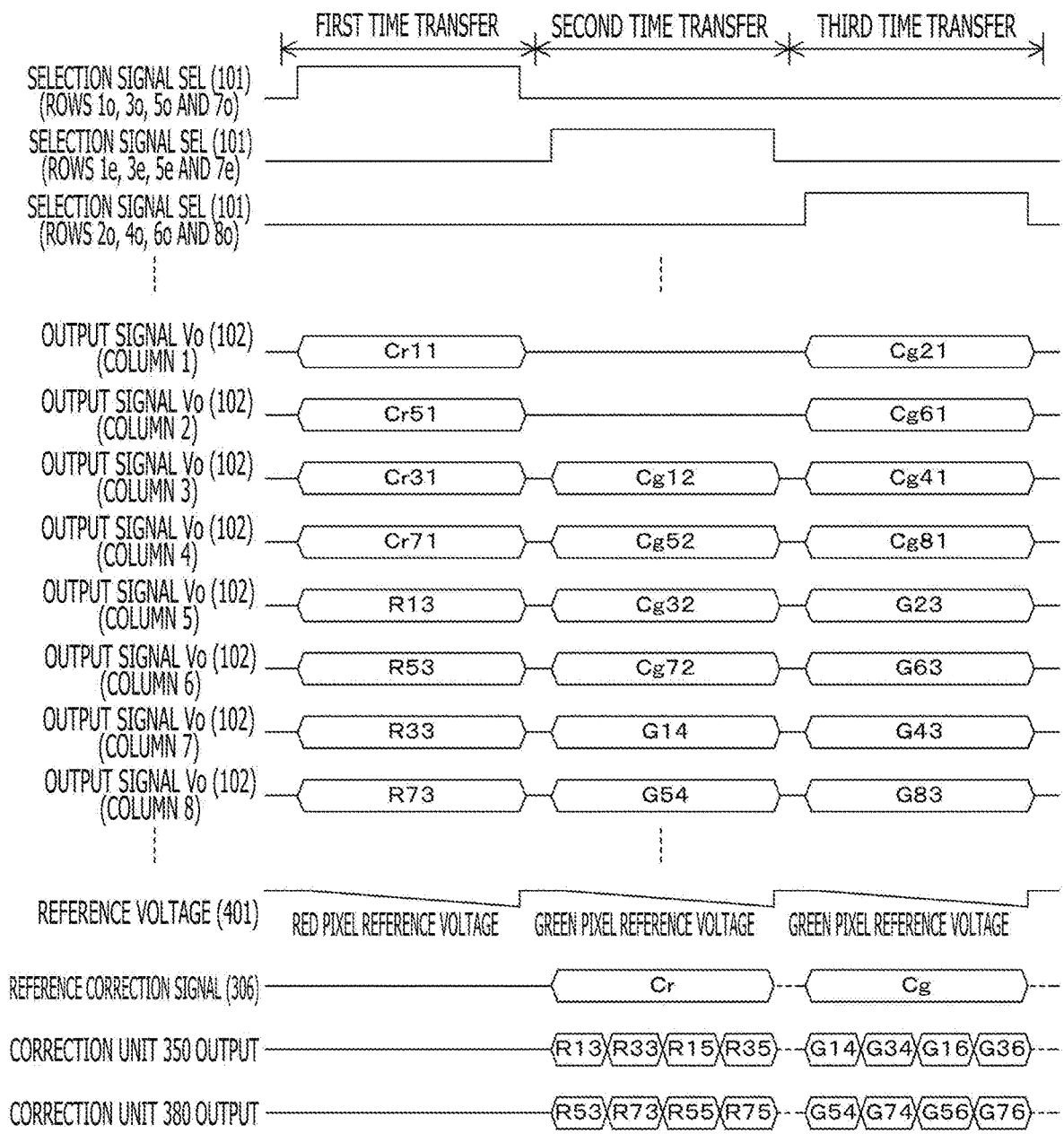
FIG. 22 is a view depicting an example of processing of the solid-state image pickup apparatus 10 in the third embodiment of the present technology.

FIG. 22 is a view depicting an example of processing of the solid-state image pickup apparatus 10 in the third embodiment of the present technology. The figure represents a relation among the selection signals SEL outputted to the row signal lines 101, output signals (analog image signals or analog correction signals) Vo outputted to the column signal lines 102 from pixels and so forth, a reference voltage, a reference correction signal and outputs of the correction units 350 and 380.

[Transfer for the First Time]

First, an on signal is inputted to the selection signal lines SEL of the row signal lines 101 of the first, third, fifth and seventh rows for odd-numbered columns. Consequently, to the column signal lines 102, "Cr11," "Cr51," "Cr31," "Cr71," "R13," "R53," "R33," "R73" and so forth are outputted. In particular, in the transfer for the first time, analog correction signals and analog image signals generated by red correction pixels and red pixels are outputted. A red pixel reference voltage is outputted from the reference voltage generation unit 400, and analog to digital conversion is performed by the analog to digital conversion unit 320. Thereafter, the converted digital image signals are horizontally transferred upon transfer for the second time and are corrected by the correction units 350 and 380. Thereupon, the reference correction signal Cr is outputted from the correction signal generation unit 340, and correction based on this is performed.

[Transfer for the Second Time]

Then, an on signal is inputted to the selection signal lines SEL of the row signal lines 101 of the first, third, fifth and seventh rows for even-numbered columns, and to the column signal lines 102, "Cg12," "Cg52," "Cg32," "Cg72," "G14," "G54" and so forth are outputted. In particular, in the transfer for the second time, analog correction signals and analog image signals generated by green correction pixels and green pixels are outputted. A green pixel reference voltage is outputted from the reference voltage generation unit 400, and analog to digital conversion is performed by the analog to digital conversion unit 320. Thereafter, the digital image signals after conversion are horizontally transferred upon transfer for the third time and are corrected by the correction units 350 and 380. Thereupon, the reference correction signal Cg is outputted from the correction signal generation unit 340.

[Transfer for the Third Time]

Then, an on signal is inputted to the selection signal lines SEL of the row signal lines 101 of the second, fourth, sixth and eighth rows for odd-numbered columns. Consequently, "Cg21," "Cg61," "Cg41," "Cg81," "G23," "G63," "G43," "G83" and so forth are outputted. Since the reference voltage, reference correction signal and operation of the correction units 350 and 380 are similar to those upon transfer for the first time, description of them is omitted.

Generation of image signals is performed by such processing as described above. In the solid-state image pickup apparatus 10 of the third embodiment of the present technology, two row signal lines 101 and two column signal lines 102 are arranged for each row and for each column in the pixel array unit 100 such that analog image signals and so forth equal in number to four times the number in the first embodiment of the present technology are outputted. Further, similarly as in the solid-state image pickup apparatus 10 of the second embodiment of the present technology, processing is performed at a high speed by two sets of analog to digital conversion units and a correction unit. It is to be noted that also it is possible to perform sorting of horizontally transferred digital image signals similarly as in the first embodiment of the present technology.

In this manner, with the third embodiment of the present technology, two row signal lines 101 and two column signal lines 102 are arranged for each row and for each column in the pixel array unit 100 such that analog image signals of pixels arranged in four rows are transmitted simultaneously. Further, the column signal processing unit 300 has two sets of analog to digital conversion units and a correction unit such that processing by them is performed in parallel. By this, higher speed generation of image signals can be performed.

4. Fourth Embodiment

In the first embodiment described above, the pixel array unit 100 including red pixels, green pixels and blue pixels arranged in a Bayer array pattern is used. In contrast, in a fourth embodiment of the present technology, a pixel array unit 100 including red pixels, green pixels, blue pixels and white pixels is used to perform generation of image signals. By this, reduction of the number of correction pixels in a solid-state image pickup apparatus 10 having white pixels is achieved.

[Configuration of Solid-State Image Pickup Apparatus]

Figure 23:
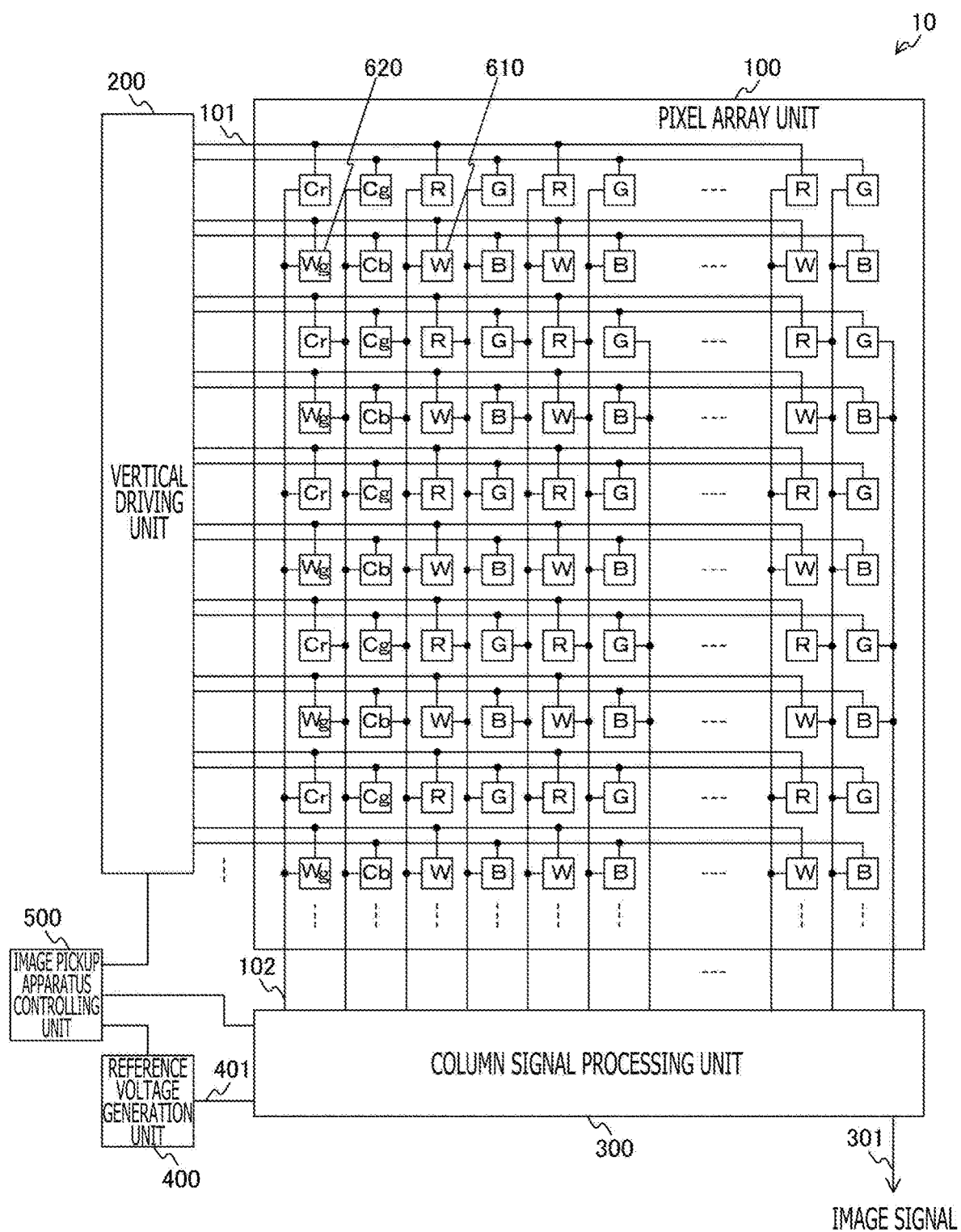
FIG. 23 is a view depicting an example of a configuration of a solid-state image pickup apparatus 10 in a fourth embodiment of the present technology.

FIG. 23 is a view depicting a configuration of the solid-state image pickup apparatus 10 in the fourth embodiment of the present technology. The pixel array unit 100 depicted in the figure is different from the solid-state image pickup apparatus 10 described hereinabove with reference to FIG. 1 in that it includes white pixels (pixels 610) for generating analog image signals in response to white light and white correction pixels (correction pixels 620) corresponding to the white pixels. In the figure, a pixel to which "W" is added corresponds to a white pixel (pixel 610), and a correction pixel to which "Wg" is added corresponds to a white correction pixel (correction pixel 620). The arrangement of the red pixels, green pixels, blue pixels and white pixels corresponds to arrangement in which one of two green pixels in the Bayer array pattern is replaced by a white pixel.

Since the configuration of the other part of the solid-state image pickup apparatus 10 is similar to that of the solid-state image pickup apparatus 10 described hereinabove with reference to FIG. 1, description of the same is omitted.

In this manner, with the fourth embodiment of the present technology, reduction of the number of correction pixels in the solid-state image pickup apparatus 10 having white pixels can be achieved.

5. Fifth Embodiment

In the first embodiment described hereinabove, upon transfer of image signals and so forth, analog image signals and so forth are outputted from pixels and so forth arranged in every other row in the pixel array unit 100. In contrast, in a fifth embodiment of the present technology, outputting of analog image signals and so forth is performed changing the interval to a different interval such as every three rows. By this, degradation of an image can be reduced.

Figure 24:
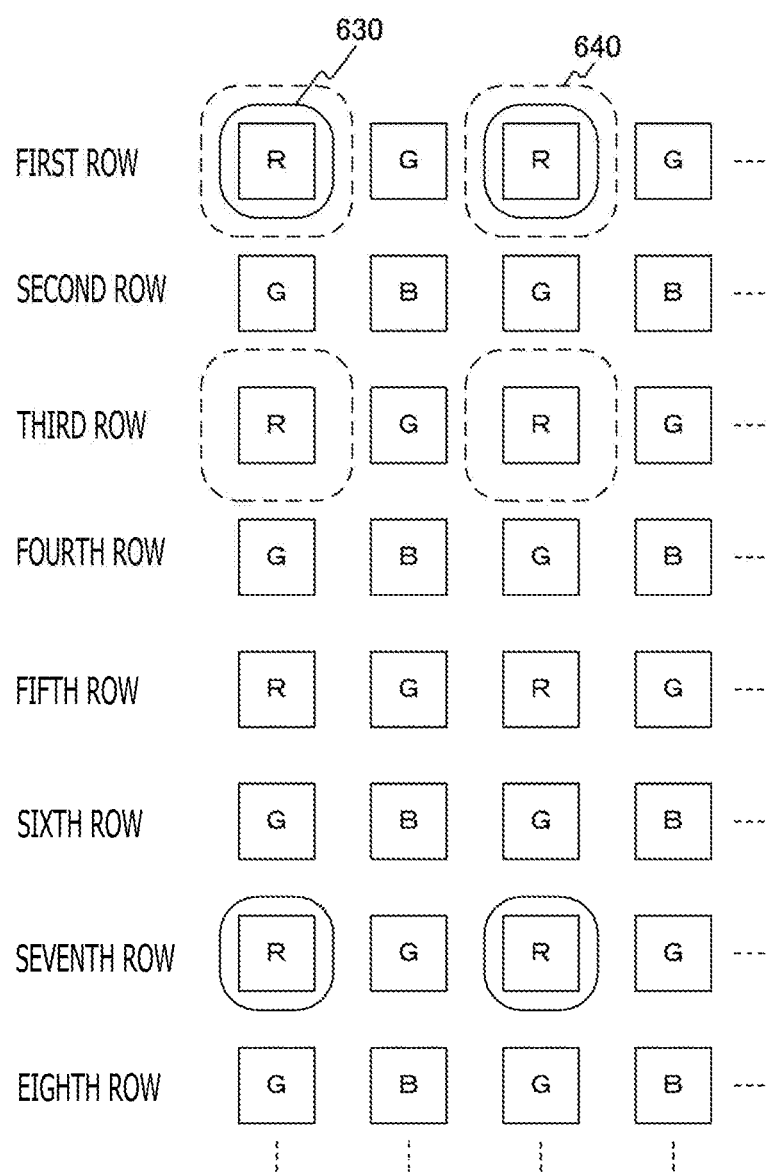
FIG. 24 is a view depicting an example of rows that are made a target of processing in a fifth embodiment of the present technology.

FIG. 24 is a view depicting an example of rows that are made a target of processing in the fifth embodiment of the present technology. The figure depicts pixels and correction pixels of the pixel array unit 100. In the figure, outputting of analog image signals and so forth is performed simultaneously from pixels and so forth of the first row and the seventh row. For example, outputting of analog image signals and so forth is performed simultaneously from red pixels and red correction pixels to which a solid line 630 is added in the figure. Thereafter, analog to digital conversion is performed by the analog to digital conversion unit 320 described hereinabove with reference to FIG. 3, and correction is performed by the correction unit 350. Here, if the level of noise that mixes into digital image signals upon analog to digital conversion and remains after correction by the correction unit 350 is represented by Vn, then this Vn has an equal value in regard to the first row and the seventh row.

In contrast, in the first embodiment of the present technology, since conversion and correction are performed for analog image signals outputted simultaneously from images and so forth arranged in the first and third rows, Vn has an equal value in regard to the first row and the third row. In this case, the values of Vn in successive rows in image signals corresponding to light of a same wavelength (in the example of FIG. 24, image signals according to red light) become equal to each other, and horizontal noise stands out. By dispersing pixels that are to be made a target of analog to digital conversion and correction in this manner, degradation of an image due to noise components that have not been removed successfully by correction can be reduced.

Further, when a resolution changing process is performed for image signals after correction by the correction unit 350, it is preferable to cause outputting of image signals and so forth and conversion by the conversion unit 390 to be performed for a plurality of rows different from a plurality of rows that are to be made a target of average value calculation by the resolution conversion process. Here, the resolution conversion process is a process for converting the resolution of an image. For example, when the resolution corresponding to 4K is to be converted into a resolution corresponding to 2K in the resolution conversion, a process for thinning out image signals configuring an image to one half in the row and column directions. Upon such thinning out, a process for calculating an average value of image signals adjacent each other and outputting the average value as a new image signal is performed. This calculation of an average value is performed between image signals corresponding to light of a same wavelength. For example, in the figure, calculation of an average value between image signals corresponding to red pixels in rows to which a broken line 640 is added (first row and third row) is performed.

As described above, in the first embodiment of the present technology, residual noise of an equal level (Vn) is superimposed on image signals arising from the pixels in the first row and the third row. Meanwhile, separately from this noise, noise components generated at random for the individual image signals are further superimposed on the image signals. Thereafter, calculation of an average value for resolution conversion is performed for the image signals.

A case is assumed in which calculation of an average value is performed for the following four image signals originating from the red pixels to which the broken line 640 is added in the figure.

| | |
|---|---|
| $S1+Vn+Vrn1$ | Image signal 11: |
| $S2+Vn+Vrn2$ | Image signal 13: |
| $S3+Vn+Vrn3$ | Image signal 31: |
| $S4+Vn+Vrn4$ | Image signal 33: |

Here, S1 to S4 represent image signal components. Vrn1 to Vrn4 represent noise components generated at random for the individual image signals. Where the components of the average value of the image signals are represented by S', Vn' and Vrn', they can be represented in the following manner.

$$S':(S1+S2+S3+S4)/4$$

$$Vn': Vn$$

$$Vrn': \sqrt{Vrn1^2+Vrn2^2+Vrn3^2+Vrn4^2}/4 = Vrn\_ave/2 \quad \text{[Math. 1]}$$

Here, Vrn_ave is an average value of Vrn1 to Vrn4. By calculation of an average value for resolution conversion, Vrn' has a value equal to one half an average value of Vrn1 to Vrn4. Therefore, the ratio of Vn' to Vrn' becomes high, and an image after resolution conversion is an image in which horizontal noise stands out.

Therefore, as depicted in the figure, a plurality of rows different from a plurality of rows that are to be made a target of average value calculation of the resolution conversion process are caused to simultaneously perform outputting of image signals and so forth and analog to digital conversion.

In this case, the image signals are represented by the following expressions.

| | |
|---|---|
| $S1+Vn1+Vrn1$ | Image signal 11: |
| $S2+Vn1+Vrn2$ | Image signal 13: |
| $S3+Vn3+Vrn3$ | Image signal 31: |
| $S4+Vn3+Vrn4$ | Image signal 33: |

Here, Vn1 and Vn3 represent residual noise components in the first row and the third row, respectively. Regarding S' and Vrn', results are same as those of the arithmetic operation described hereinabove. Meanwhile, Vn' can be represented in the following manner.

$$Vn': \sqrt{Vn1^2+Vn3^2}/2 = Vn\_ave/\sqrt{2} \quad \text{[Math. 2]}$$

Here, Vn_ave is an average value of Vn1 and Vn3. The level of Vn' becomes small in this manner, and in comparison with the case described above, the ratio of Vn' to Vrn' can be reduced. Therefore, horizontal noise becomes less standing out, and degradation of an image can be reduced.

The configuration of the other part of the solid-state image pickup apparatus 10 is similar to that of the solid-state image pickup apparatus 10 described hereinabove with reference to FIG. 1, and therefore, description of the same is omitted.

By setting rows that are to be made a target of outputting of analog image signals and analog to digital conversion to rows having an interval therebetween other than every other row, degradation of an image can be reduced.

As described above, with the embodiment of the present technology, since correction of image signals is performed with correction signals generated from correction pixels arranged in a plurality of rows, the number of correction pixels to be arranged in the pixel array unit 100 can be reduced.

It is to be noted that the embodiments described above indicate an example for embodying the present technology, and matters in the embodiments and invention specific matters of the claims individually have corresponding relations. Similarly, invention specific matters of the claims and matters in the embodiments of the present technology to which same names are applied individually have corresponding relations. However, the present technology is not limited to the embodiments but can be embodied by applying various modifications to the embodiments without departing from the subject matter of the present technology.

Further, any of the processing procedures described hereinabove in connection with the above-described embodiments may be grasped as a method having the series of steps and may be grasped as a program for causing a computer to execute the series of steps or as a recording medium in which the program is stored. As the recording medium, for example, a CD (Compact Disc), an MD (Mini Disc), a DVD (Digital Versatile Disc), a memory card, a blue ray disc (Blu-ray (registered trademark) Disc) and so forth can be used.

It is to be noted that the advantageous effects described herein are exemplary to the last and are not restrictive, and other advantages may be available.

It is to be noted that the present technology can take the following configurations.

(1) A solid-state image pickup apparatus, including:
a pixel array unit in which image signal generation pixels for generating analog image signals in response to light irradiated thereupon and correction signal generation pixels for generating analog correction signals for correcting the image signals are arranged in a matrix pattern;

a conversion unit that performs first conversion that is conversion from the analog image signals generated by the image signal generation pixels arranged in a row in the matrix pattern into digital image signals, and second conversion, which is conversion performed at substantially the same time with the first conversion, from the analog correction signals generated by the correction signal generation pixels arranged in a plurality of rows in the matrix pattern into digital correction signals; and a correction unit that performs correction of the digital image signals with the digital correction signals generated in the plurality of rows.

(2) The solid-state image pickup apparatus according to (1), in which the correction unit performs the correction based on an average of the digital correction signals generated in the plurality of rows.

(3) The solid-state image pickup apparatus according to (1) or (2), in which the conversion unit performs first conversion that is conversion from the analog image signals generated by the image signal generation pixels arranged in a plurality of rows in the matrix pattern into the digital image signals, and the second conversion.

(4) The solid-state image pickup apparatus according to any one of (1) to (3), in which the pixel array unit includes a plurality of image signal generation pixels corresponding to light of wavelengths different from each other, and the correction unit performs the correction for each of the image signal generation pixels corresponding to light of the plurality of wavelengths different from each other.

(5) The solid-state image pickup apparatus according to (4), in which the conversion unit performs first conversion that is conversion from the analog image signals generated by the image signal generation pixels arranged in a plurality of rows in the matrix pattern and corresponding to light of a same wavelength into the digital image signals, and the second conversion.

(6) The solid-state image pickup apparatus according to (5), in which, in the pixel array unit, the plurality of image signal generation pixels corresponding to light of the wavelengths different from each other are arranged based on a given rule.

(7) The solid-state image pickup apparatus according to (6), in which the pixel array unit includes red pixels that generate analog image signals corresponding to red light, green pixels that generate analog image signals corresponding to green light and blue pixels that generate analog image signals corresponding to blue light, which are disposed in a Bayer array pattern.

(8) The solid-state image pickup apparatus according to (7), in which the pixel array unit includes a plurality of column signal lines that transmit the analog image signals and the analog correction signals to the conversion unit, and the red pixels, green pixels, blue pixels and correction signal generation pixels are electrically connected to different ones of the column signal lines for every two rows in the matrix pattern.

(9) The solid-state image pickup apparatus according to (6), in which the pixel array unit includes red pixels that generate analog image signals corresponding to red light, green pixels that generate analog image signals corresponding to green light, blue pixels that generate analog image signals corresponding to blue light and white pixels that generate analog image signals corresponding to white light.

(10) The solid-state image pickup apparatus according to (5), in which the conversion unit performs first conversion that is conversion from the analog image signals generated by the image signal generation pixels that are arranged in the plurality of rows, different from a plurality of rows that are made a target of an average value calculation in a resolution conversion process that is a process for converting a resolution of an image including the digital image signals for which the correction has been performed, and correspond to light of a same wavelength into the digital image signals, and the second conversion.

(11) The solid-state image pickup apparatus according to any one of (1) to (6), in which the correction unit generates image signals corresponding to differences between noise generated based on the digital correction signals and the digital image signals to perform the correction.

(12) The solid-state image pickup apparatus according to any one of (1) to (7), in which the correction signal generation pixels generate, as the analog correction signals, the analog image signals that include the image signal generation pixels blocked against light and from which an influence of external light is eliminated.

(13) A driving method for a solid-state image pickup apparatus, including:

a conversion procedure for performing first conversion that is conversion from analog image signals generated by image signal generation pixels arrayed in a row in a matrix pattern of a pixel array unit, in which the image signal generation pixels for generating analog image signals in response to light irradiated thereupon and correction signal generation pixels for generating analog correction signals for correcting the image signals are arranged in the matrix pattern, into digital image signals, and second conversion, which is conversion performed at substantially the same time with the first conversion, from the analog correction signals generated by the correction signal generation pixels arranged in a plurality of rows in the matrix pattern into digital correction signals; and a correction procedure for performing correction of the digital image signals with the digital correction signals generated in the plurality of rows.

REFERENCE SIGNS LIST

10 Solid-state image pickup apparatus
100 Pixel array unit
101 Row signal line
102 Column signal line
110, 120, 130, 140, 610 Pixel 111 Photoelectric conversion unit
113 Charge transfer unit
114 Charge discharging unit
115 Charge holding unit
116 Amplification unit
117 Selection unit
150, 160, 170, 180, 620 Correction pixel
200 Vertical driving unit
300 Column signal processing unit
310 Constant current power supply
320 Analog to digital conversion unit
321 Comparison unit
322 Counting unit
323 Holding unit
330 Conversion controlling unit
340 Correction signal generation unit
341, 342, 345, 346 Average value calculation unit
343, 344, 347 Correction signal selection unit
350, 380 Correction unit
351 Subtraction unit
360 Sorting unit
361 Line memory
362 Sorting selection unit
390 Conversion unit
400 Reference voltage generation unit
410 Red pixel reference voltage generation unit
420 Green pixel reference voltage generation unit
430 Blue pixel reference voltage generation unit
440, 450, 460 Reference voltage selection unit
500 Image pickup apparatus controlling unit

The invention claimed is:

1. A solid-state image pickup apparatus, comprising:
a pixel array unit comprising:
image signal generation pixels for generation of analog image signals based on irradiated light; and
correction signal generation pixels for generation of analog correction signals for correction of the analog image signals,
wherein the image signal generation pixels and the correction signal generation pixels are in a matrix pattern;
a conversion unit configured to execute:
a first conversion from the analog image signals, generated by the image signal generation pixels in a row in the matrix pattern, into digital image signals; and
a second conversion from the analog correction signals, generated by the correction signal generation pixels in a first plurality of rows in the matrix pattern, into digital correction signals,
wherein the first conversion and the second conversion are concurrent in time; and
a correction unit configured to execute correction of the digital image signals with the digital correction signals.

2. The solid-state image pickup apparatus according to claim 1,
wherein the correction unit is further configured to execute the correction based on an average of the digital correction signals.

3. The solid-state image pickup apparatus according to claim 1, wherein
the conversion unit is further configured to execute the first conversion from the analog image signals, generated by the image signal generation pixels in a second plurality of rows in the matrix pattern, into the digital image signals, and
the second plurality of rows includes the row in the matrix pattern.

4. The solid-state image pickup apparatus according to claim 1,
wherein a wavelength of light of a first image signal generation pixel of the image signal generation pixels is different from a wavelength of light of a second image signal generation pixel of the image signal generation pixels, and
the correction unit is further configured to execute the correction for each of the first image signal generation pixel and the second image signal generation pixel.

5. The solid-state image pickup apparatus according to claim 4, wherein
the conversion unit is further configured to execute the first conversion from the analog image signals, generated by the image signal generation pixels in a second plurality of rows in the matrix pattern, into the digital image signals, and
the analog image signals correspond to light of a same wavelength.

6. The solid-state image pickup apparatus according to claim 5,
wherein, in the pixel array unit, the first image signal generation pixel and the second image signal generation pixel based on a specific rule.

7. The solid-state image pickup apparatus according to claim 6,
wherein the pixel array unit includes red pixels that generate the analog image signals corresponding to red light, green pixels that generate the analog image signals corresponding to green light and blue pixels that generate the analog image signals corresponding to blue light, and
the red pixels, the green pixels, and the blue pixels in the pixel array unit are in a Bayer array pattern.

8. The solid-state image pickup apparatus according to claim 7,
wherein the pixel array unit includes a plurality of column signal lines which transmits the analog image signals and the analog correction signals to the conversion unit, and
the red pixels, the green pixels, the blue pixels and the correction signal generation pixels are electrically connected to the plurality of column signal lines, and
a first pair of rows in the matrix pattern and a second pair of rows, adjacent to the first pair of rows, in the matrix pattern are electrically connected to different columns of the plurality of column signal lines.

9. The solid-state image pickup apparatus according to claim 1,
wherein the correction unit is further configured to generate a plurality of first image signals corresponding to differences between noise generated based on the digital correction signals and the digital image signals to execute the correction.

10. The solid-state image pickup apparatus according to claim 1,
wherein the correction signal generation pixels generate the analog correction signals based on the analog image signals from the image signal generation pixels blocked against the light.

11. A driving method for a solid-state image pickup apparatus, comprising:
converting from analog image signals, generated by image signal generation pixels in a row in a matrix pattern of a pixel array unit, into digital image signals, wherein, the pixel array unit comprises the image signal generation pixels for generating the analog image signals based on irradiated light and correction signal generation pixels for generating analog correction signals for correcting the analog image signals, and the image signal generation pixels and the correction signal generation pixels are in the matrix pattern, and, converting from the analog correction signals, generated by the correction signal generation pixels in a plurality of rows in the matrix pattern, into digital correction signals, wherein the conversion from the analog image signals into the digital image signals and the conversion from the analog correction signals into the digital correction signals are concurrent in time; and correcting the digital image signals with the digital correction signals.

\* \* \* \* \*